(12) United States Patent
Guo et al.

(10) Patent No.: US 7,270,728 B2
(45) Date of Patent: Sep. 18, 2007

(54) PHOTOCHEMICAL TRANSFORMATION OF METALLIC AND NON-METALLIC IONS IN AN AQUEOUS ENVIRONMENT

(75) Inventors: Xuming Guo, Ottawa (CA); Ralph E. Sturgeon, Orleans (CA); Zoltan Mester, Orleans (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 11/521,410

(22) Filed: Sep. 15, 2006

(65) Prior Publication Data

US 2007/0007121 A1    Jan. 11, 2007

Related U.S. Application Data

(62) Division of application No. 10/643,151, filed on Aug. 19, 2003, now abandoned.

(60) Provisional application No. 60/444,983, filed on Feb. 5, 2003, provisional application No. 60/404,128, filed on Aug. 19, 2002.

(51) Int. Cl.
*B01J 19/08* (2006.01)
*C07F 15/00* (2006.01)
*C07F 395/00* (2006.01)
*C07C 391/00* (2006.01)

(52) U.S. Cl. ............... 204/157.75; 556/140; 556/141; 562/899

(58) Field of Classification Search ........... 204/157.75; 556/140, 141; 562/899
See application file for complete search history.

(56) References Cited

OTHER PUBLICATIONS

Purcell and Kotz, Inorganic Chemistry, pp. 856-859 (1977).*
R. Bruce King, Organometallic Synthesis, vol. 1: Transition-Metal Compounds, Academic Press, New York (1965) pp. 92-104.*
P.W. Jolly and G. Wilke, The Organic Chemistry of Nickel, vol. 1, Organonickel Complexes, Academic Press, New York (1974) pp. 1-5.*

* cited by examiner

*Primary Examiner*—Porfirio Nazario-Gonzalez
(74) *Attorney, Agent, or Firm*—Jones, Tullar & Cooper, P.C.

(57) ABSTRACT

The invention comprises a method of photochemical transformation of metallic and non-metallic ions in an aqueous environment. The method comprises exposing the ions to UV irradiation in the presence of an organic acid. The aqueous ions are reduced by the method and may form hydrides, alkyl or carbonyl compounds.

12 Claims, 19 Drawing Sheets

PHOTOCHEMICAL TRANSFORMATION OF METALLIC AND NON-METALLIC IONS IN AN AQUEOUS ENVIRONMENT

CROSS REFERENCE TO RELATED APPLICATIONS

This application is a divisional under 35 U.S.C. 120 of copending U.S. application Ser. No. 10/643,151, filed Aug. 19, 2003, now abandoned which claims the benefit, under 35 U.S.C. 119(e), of U.S. Provisional Application No. 60/404,128 filed Aug. 19, 2002 and U.S. Provisional Application No. 60/444,983 filed Feb. 5, 2003 entitled "Photochemical Transformation/Volatilization of Various Metallic Metalloid And Non Metallic Elements by UV Irradiation" filed by inventors Guo Xu Ming and Ralph Sturgeon.

FIELD OF INVENTION

The subject invention is directed to a method whereby UV radiation and an organic acid are used to reduce, alkylate or carbonylate an ion of a noble or transition metal in an aqueous environment. The method may also be used with aqueous ions of other elements including sulfur, iodine and phosphorus.

BACKGROUND OF THE INVENTION

Biomethylation of heavy metals has been the subject of great interest for more than one hundred years and has become accepted as a common, but important, chemical process occurring in the environment for many elements, including tin, mercury, iodine, bromine, and sulfur [1]. More recently, bio-transformation of antimony and arsenic compounds to volatile toxic species has been linked to sudden infant death syndrome (SIDS) [2-3].

Although almost all emphasis has been placed on biomethylation, some recent research has shown that a methyl-chromium bond has been formed during the photolysis of tert-butoxy radicals and chromium (II) in aqueous solution [4]. In the presence of acetate ion or acetic acid in aqueous solution, $Hg^{2+}$ gives rise to methylmercury following photolysis in sunlight (UV light) [5]. By using X-ray irradiation, Landner obtained mercury-resistant strains of Neurospora, which produced more methylmercury than the parent strain [6]. In monocultures of some phototrophic bacterial cultures amended with tellurate or elemental Te (powdered metal), dimethyltelluride was detected after 7 days of growth in the light [7]. In the case of selenium, use of a $TiO_2$ photocatalyst and UV irradiation, permitted removal of selenate ions from an aqueous solution, presumably by formation of volatile $SeH_2$ [8]. Synthetic seawater, spiked with organo-selenium compounds and exposed to radiation from "sunlight', produced methylated selenium, which was not the case with spikes of inorganic selenium [9].

Bio-methylation of heavy metals has been the subject of great interest for more than one hundred years. Initial investigations centered on the identification of a garlic odor, which was often present in damp rooms decorated with green wallpaper pigmented with arsenic compounds. When fungal growth was favored, illness and fatalities often resulted for those who slept in such rooms. In 1901, Gosio identified a volatile methylated arsenic compound having a garlic odor, and suggested that diethylarsine was released from moulds growing in the presence of inorganic arsenic [12]. The fungus, originally termed Penicillium brevicaule, latter called Scopulariopsis brevicaula (S. Brevicaulis), produced the garlic smelling gas, which had been the cause of a number of intoxication incidents. However, a re-examination of the issue by Challenger and colleagues in 1933 conclusively demonstrated that Gosio Gas was, in fact, trimethylarsine [13-14]. Considering that selenium may have also been present as a contaminant in the arsenic pigments, work in his laboratory soon demonstrated that methylation of selenium to dimethylselenide was also possible [15]. Since then, biomethylation has become accepted as a common, but important, chemical process occurring in the environment for many elements, e.g., for tin, mercury, iodine, bromine, and sulfur [16]. More recently, bio-transformation of antimony and arsenic compounds to volatile toxic species has been linked to sudden infant death syndrome (SIDS) [17-18]. In the 1950's, the devastating cases of "Minamata disease" (methylmercury poisoning) in Japan accelerated investigations into this phenomenon.

Selenium has been identified as an essential trace element; excessively low or high dietary intake results in toxicity and thus constitutes a threat to personal health [19, 20]. Obtaining sufficient selenium in the diet may protect against cardiovascular disease [19], viral infections (including influenza [21] and HIV [22, 23]), rheumatoid arthritis [24], liver disease [25], and serve to detoxify heavy metals as well as prevent some forms of cancer [26-27]. Selenium-binding enzymes, glutathione peroxidases (GPx), are responsible for eliminating such harmful oxidants as hydrogen peroxide and lipid peroxides. A deficiency of active Se-bound GPx appears to play a crucial role in the pathology of many conditions associated with selenium deficiency [20, 23, 28]. At higher selenium concentrations, the metal and its salt often inhibit biological activity. Selenite is much more toxic than selenate, both in vivo and in vitro [29-30], however, dimethylselenide is 500- to 700- fold less toxic to rats than aqueous selenite and selenate [31-32]. As one of several detoxification processes, it has been known for over a century that bacteria are capable of reducing selenium salts to elemental selenium [33]. In the presence of stomach acid, selenite is converted to selenious acid and is further converted to inactive, elemental selenium if vitamin C is ingested simultaneously [34]. Many suboxic sediments and soils contain an Fe(II, III) oxide, which reduces selenium from an oxidation state of +VI to 0 in the natural environment [35]. Bacteria [36-41], plants [42-43], decaying plant detritis [44], marine algae and plankton [46-47] as well as animals [48] have all been shown to be capable of methylating selenium from the selenate (VI) and selenite (IV) oxidation states, even from the elemental selenium state. Rats fed selenate or selenite exhale dimethylselenide [48]. A garlic odor present in the breath of workmen engaged in the extraction of selenium from electrolytic copper "slimes" has also been detected by Dudley [49]; the exhaled product is almost certainly dimethylselenide [15]. Consequently, biomethylation of selenium in soils, sediments, plants, fresh water systems and the marine environment into DMSe is considered to be a major source of atmospheric selenium [50-51]. Losses of selenium from soils by bio-methylation may, in some cases, give rise to an insufficient supply of selenium to animals [52]. The reduction of Se oxyanions to $Se^0$, followed by further reduction and methylation to a volatile methylated form is commonly regarded as the most important detoxification route in biological systems. Such processes have also been widely applied, despite numerous unpleasant byproducts which may be produced, for reducing Se contamination in wastewater arising from agricultural drainage systems, power plants, oil refineries and electronic industries [53-57].

Although almost all emphasis has been placed on bio-methylation, some recent research has shown that a methylchromium bond has been formed during the photolysis of tert-butoxy radicals and chromium (II) in aqueous solution [58]. In the presence of acetate ion or acetic acid in aqueous solution, $Hg^{2+}$ gives rise to methylmercury following photolysis in sunlight (UV light) [59]. By using X-ray irradiation, Landner obtained mercury-resistant strains of *Neurospora*, which produced more methylmercury than the parent strain [60]. In monocultures of some phototrophic bacterial cultures amended with tellurate or elemental Te (powdered metal), dimethyltelluride was detected after 7 days of growth in the light [61]. In the case of selenium, use of a $TiO_2$ photocatalyst and UV irradiation, permitted removal of selenate ions from an aqueous solution, presumably by formation of volatile $SeH_2$ [62]. Synthetic seawater, spiked with organo-selenium compounds and exposed to radiation from "sunlight', produced methylated selenium, which was not the case with spikes of inorganic selenium [63].

These studies clearly indicate that photolysis may play a significant role in the transformation of heavy metals in the environment. However, there have been no reports on the role of direct photochemical alkylation of inorganic selenium. The unique photoelectric and semiconductor properties of this element have been widely utilized in photocell devices and in xerography, solar batteries, specialty transformers and rectifiers, all serving to release it into the environment where some fraction is transformed into organoselenium compounds by biological systems. Despite much progress in understanding bio-methylation as a link between inorganic and organic selenium under natural conditions, this goal remains elusive. At the molecular level, reduction and bio-methylation of selenium with or without involvement of light is not well understood. Photosynthesis is a most important process in nature by which green plants, alga, and photosynthetic bacteria use energy from sunlight to stimulate chemical reactions in plants, it may play a role in reduction, bio-methylation and mobilization of inorganic selenium, but this remains to be clarified.

In 1879, Mond discovered that carbon monoxide, passed over finely divided nickel metal, formed gaseous nickel tetracarbonyl $[Ni(CO)_4]$. This is a readily reversible reaction in that the carbonyl can be decomposed to yield nickel metal and carbon monoxide at 180° C. [102]. The resulting Mond Process became one of the truly elegant metallurgical procedures and the discovery was also a notable step in the history of organometallic chemistry, which led to Reppe catalysts (using nickel carbonyl for synthesis). Nickel catalyzes the gasification of biomass and is also operative in biological systems [103-108] catalyzing biochemical reactions. The discovery of new synthetic methods for production of nickel carbonyl and its cluster species is of interest not only for application to new commercial materials, but is also of theoretical significance, for it enriches our information of metal cluster bonding, permitting further insight into an understanding of chemical reactions under various conditions.

Methods for the production of $Ni(CO)_4$ have been documented in 55 patents since 1955 [109] most of them dealing with dry contact methods for the reduction of ores, oxides, or salts for preparing the highly active metal, followed by reaction with carbon monoxide. The discovery of new and easier preparative procedures for organometallic compounds has always been regarded as a great rebirth or expansion of classical organometallic chemistry [110].

However, in many circumstances, bio-detoxification is unavailable or insufficient to remove contaminants such as metal ions from aqueous environments. Accordingly, there is a need for others means to reduce, alkylate or carbonylate ions of noble and transition metals in aqueous environments.

SUMMARY OF THE INVENTION

The invention provides a method of:
a) reducing an ion of a metal in an aqueous environment;
b) synthesizing a compound which contains a metal-carbon bond from an ion of said metal in an aqueous environment;
c) synthesizing an alkyl metal compound from an ion of said metal in an aqueous environment;
d) synthesizing a metal carbonyl compound from an ion of said metal in an aqueous environment;
e) synthesizing a metal hydride compound from an ion of said metal in an aqueous environment;
f) converting an ion of a metal in an aqueous environment into a volatile compound; or
g) extracting an ion of a metal in an aqueous environment;

wherein said metal is selected from the group consisting of noble metals and transition metals comprising the steps of:
i) adding a carboxylic acid to the aqueous environment; and
ii) exposing the metal ion and the carboxylic acid in the aqueous environment to a source of UV light.

In another embodiment, the invention provides a method of:
a) reducing an ion of an element in an aqueous environment;
b) synthesizing a compound which contains an element-carbon bond from an ion of said element in an aqueous environment;
c) synthesizing an alkyl element compound from an ion of said element in an aqueous environment;
d) synthesizing an element carbonyl compound from an ion of said element in an aqueous environment;
e) synthesizing an element hydride compound from an ion of said element in an aqueous environment;
f) converting an ion of an element in an aqueous environment into a volatile compound; or
g) extracting an ion of an element in an aqueous environment;

wherein said element is selected from the group consisting of S, P, I, As, Bi, Cu, Au, Pt, Pd, Hg, Sb, Sn, Te, Co, Fe, Cd, Rh, Ag, Se, Pb and Ni comprising the steps of:
i) adding a carboxylic acid to the aqueous environment; and
ii) exposing the ion of the element and the carboxylic acid in the aqueous environment to a source of UV light.

In a preferred embodiment, the carboxylic acid is selected from the group consisting of formic acid, acetic acid, propionic acid and malonic acid. In another preferred embodiment, a photocatalyst is added to the aqueous environment. Preferred photocatalysts include $TiO_2$ and $NO_3^-$.

In an additional preferred embodiment, the invention comprises a method of converting an ion of a metal in an aqueous environment into a volatile compound wherein said metal is selected from the group consisting of noble metals and transition metals comprising the steps of:
i) adding a carboxylic acid to the aqueous environment; and
ii) exposing the metal ion and the carboxylic acid in the aqueous environment to a source of UV light.

In a further preferred embodiment, the method of volatilization is worked with ions of a metal selected from the group consisting of As, Bi, Cu, Au, Pt, Pd, Hg, Sb, Sn, Te, Co, Fe, Cd, Rh, Ag, Se, Pb and Ni.

BRIEF DESCRIPTION OF FIGURES

FIG. 9a is the total ion chromatogram.

DETAILED DESCRIPTION

Instrumentation

A. For Noble and Transition Metals

Figure 1:
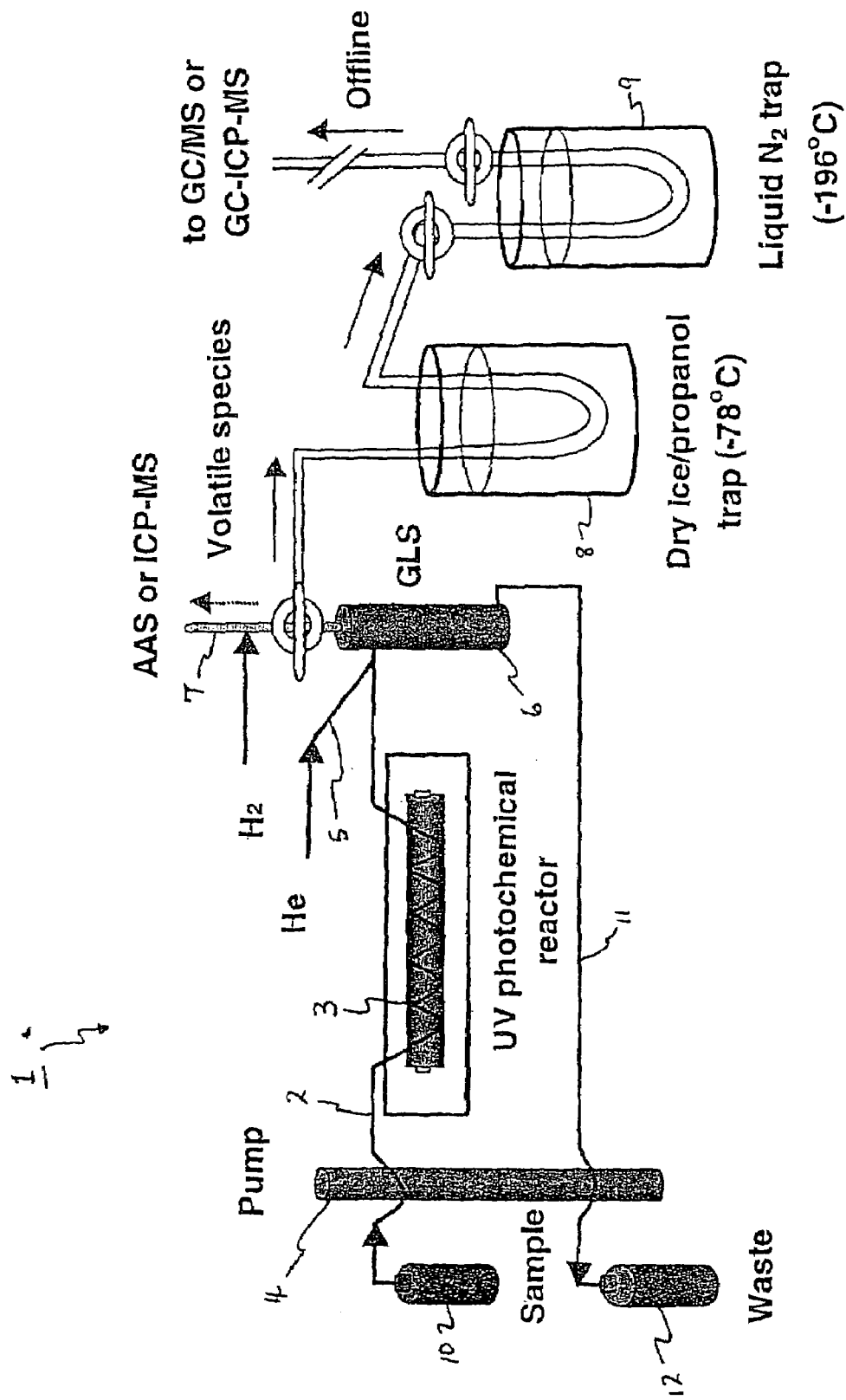
FIG. 1. Schematic of the experimental system.

A flow through photoreactor (1), consisting of a 5 m length of 18 gauge polytetrafluoroethylene (PTFE) tubing (Alpha Wire Corp., New Jersey, U.S.A.) of dimensions 1.74 mm o.d.×1.10 mm i.d.(2) wrapped around either of two low-pressure Hg vapor UV lamps (3) (254 nm, 3 W or 15 W, Cole Parmer, USA), was constructed. A schematic of this system is illustrated in FIG. 1. Samples from a supply chamber (10) were propelled through the tubing with the aid of a Minipuls 2 peristaltic pump (4) (Gilson, Middleton, Wis.) operating at a speed of 50 rev $min^{-1}$, corresponding to a solution flow rate of 2 mL $min^{-1}$ and solution irradiation times of 2 min. UV vapor generation was accomplished in a continuous-flow mode as the sample was passed through the PTFE tube for irradiation. A 55 mL $min^{-1}$ flow of He purge gas (5) was introduced into a gas-liquid separator (6), where the effluent from the UV photoreactor was directly merged with the He flow. The resultant volatile species were transported by the He flow from the gas-liquid separator either directly to a detector via a 10 cm length of PTFE transfer tubing (7), or indirectly through a first U-shaped glass condensation tube in a dry ice/propanol trap (8) and a second U-shaped glass condensation tube in a cryogenic (liquid $N_2$) trap (9). The non-volatile aqueous phase was channelled from the gas-liquid separator (6) to a waste container (12) via PTFE tubing (11).

Measurements were made on-line in a continuous mode with the generator to characterize the yield of the reaction products and also in an off-line manner to trap the volatile species in an effort to subsequently characterize them via GC-MS and GC-ICP-MS techniques. For this latter purpose, a series of cryogenically cooled U-tube traps (8, 9) were occasionally placed between the generator and the detector to condense the generated analyte species, as described below.

In order to avoid clogging of the cryogenically cooled U-tube and possible decomposition of any volatile compounds by concomitant water, a dry ice-methanol trap (-78° C.)(8), into which a U-tube was immersed, was first used to remove any water vapor carried over from the UV photochemical reaction system.

A Hewlett-Packard (HP) model 6890 gas chromatograph was interfaced to an HP5973 mass selective detector (mass range 60-270 Daltons). Splitless sample injection was used. Sample aliquots of 250 μL were manually injected. The transfer line temperature was 280° C. A carrier gas flow rate was set at 0.8 mL $min^{-1}$. An 18-minute temperature program was used with an initial temperature of 60° C. and a hold time of 10 minutes followed by a ramp of 90° C. $min^{-1}$ to a temperature of 280° C., which was held for 10 minutes.

A Perkin-Elmer SCIEX ELAN 6000 (Concord, Ontario, Canada) ICP-MS instrument was interfaced to a Varian 3400 GC (Varian Canada, Georgetown, Canada) equipped with a 15 m length of DB-1 column (0.32 mm) through an in-house heated transfer line [10]. The sampling process and GC conditions were similar to those used above for GC-MS measurements. The ICP-MS was operated in accordance with the manufacturer's recommendations.

Multielement measurements of vapors desorbed from a PDMS solid phase microextraction fiber (Supelco, Bellefonte, Pa.) which had previously been exposed to the headspace above a photoreactor, were accomplished with an Optimass8000 inductively coupled plasma time-of-flight mass spectrometer (GBC Scientific Equipment Pty. Ltd., Australia). The operating conditions for the ICP-TOF-MS were optimized with solution nebulization. Gaseous sample introduction from the SPME fiber was achieved using an in-house heated desorption interface, as described earlier.

B. For Selenium

A flow through photoreactor, consisting of a 5 m length of 1 mm i.d. polytetrafluoroethylene (PTFE) tubing (Cole Parmer Instrum. Co., Vernon Hills, Ill.) wrapped around either of two low-pressure Hg vapor UV lamps (254 nm, 3 W or 15 W, Cole Parmer, USA) was constructed. This provided an incident radiation of ~48 mW/cm$^2$ and sample solution irradiation times of 2 min. A schematic of this system is illustrated in FIG. 1. Samples were propelled through the tubing with the aid of a Minipuls 2 peristaltic pump (Gilson, Middleton, Wis.) operating at a speed of 50 rev min$^{-1}$, corresponding to a solution flow rate of 2 ml min$^{-1}$. UV vapor generation was accomplished in a continuous-flow mode as the sample was passed through the PTFE tube for irradiation. A 55 ml min–1 flow of He purge gas was introduced into a gas-liquid separator, where the effluent from the UV photoreactor was directly merged with the He flow. The resultant volatile species were transported by the He flow from the gas-liquid separator either directly to a heated quartz tube atomizer via a 10 cm length of PTFE transfer tubing, or through an intermediate cryogenically cooled U-shaped glass condensation tube. The quartz tube atomizer temperature was maintained at 900° C. This was accomplished using a Perkin-Elmer FIAS-400 flow injection accessory to provide the power and temperature feedback for the quartz tube. The former was controlled with the use of a dedicated, separate PC. A flow rate of 15 ml min$^{-1}$ H$_2$ was introduced via a second line into the atomizer to aid in the atomization of selenium.

The quartz tube atomizer was mounted in the burner (optical) compartment of a Perkin Elmer Model 4100 atomic absorption spectrometer fitted with a Perkin-Elmer electrodeless discharge lamp (EDL System II). The EDL was operated at 350 mA and radiation was detected at the resonance wavelength of 196.0 nm using a bandpass of 0.2 nm (low slit). Simultaneous deuterium background correction was applied for all measurements. Both peak-height and integrated absorbance measurements were recorded.

Measurements were made on-line in a continuous mode with the generator to characterize the yield of the reaction products and also in an off-line manner to trap the volatile species in an effort to subsequently characterize them via GC-MS and GC-ICP-MS techniques. For this latter purpose, a series of cryogenically cooled U-tube traps were occasionally placed between the generator and the detector to condense the generated analyte species, as described below.

In order to avoid clogging of the cryogenically cooled U-tube and possible decomposition of any volatile Se compounds by concomitant water, a dry ice-methanol trap (–78° C.), into which a U-tube was immersed, was first used to remove any water vapor carried over from the UV photochemical reaction system. Continuous monitoring of the AAS signal for selenium confirmed that there were no losses of volatile selenium species incurred by passage through this dry ice trap. The second U-tube, packed with glass wool and immersed in liquid nitrogen (–196° C.), was used for trapping the volatile species swept from dry ice bath. Continuous on-line monitoring of the AAS signal revealed that the volatile selenium species were completely trapped in this second U-tube. Helium was chosen as the carrier gas because it is not condensed in the U-tube at liquid nitrogen temperatures and does not introduce any mass spectral interferences in the subsequent identification of trapped species by GC-ICP-MS and GC/MS. Prior to commencing the trapping experiment, the U-tubes were flushed with He for 10 min at room temperature in order to eliminate any memory effects and to maintain a reliable and controlled blank value.

A Hewlett-Packard (HP) model 6890 gas chromatograph was interfaced to an HP5973 mass selective detector (mass range 60-270 Daltons). Selenium compounds were separated on a 30 m×0.25 mm i.d.×0.25 mm film (J&W Scientific) DB1 capillary column (1% phenyl, 99% polydimethylsiloxane) using UHP helium carrier gas and a head pressure of 12.5 psi. Splitless sample injection was used. Sample aliquots of 250 µL were manually injected. The transfer line temperature was 280° C. A carrier gas flow rate was set at 0.8 mL min$^{-1}$. An 18-minute temperature program was used with an initial temperature of 60° C. and a hold time of 10 minutes followed by a ramp of 90° C. min$^{-1}$ to a temperature of 280° C., which was held for 10 minutes.

A Perkin-Elmer SCIEX ELAN 6000 (Concord, Ontario, Canada) ICP-MS instrument was interfaced to a Varian 3400 GC (Varian Canada, Georgetown, Canada) equipped with a 15 m length of DB-1 column (0.32 mm) through an in-house heated transfer line [64]. The sampling process and GC conditions were similar to those used above for GC-MS measurements. The ICP-MS was operated in accordance with the manufacturer's recommendations with the $^{78}$Se isotope selected for detection.

Multielement measurements of vapors desorbed from a PDMS solid phase microextraction fiber (Supclco, Bellefonte, Pa.) which had previously been exposed to the headspace above a photoreactor, were accomplished with an Optimass8000 inductively coupled plasma time-of-flight mass spectrometer (GBC Scientific Equipment Pty. Ltd., Australia). The operating conditions for the ICP-TOF-MS were optimized with solution nebulization. Gaseous sample introduction from the SPME fiber was achieved using an in-house heated desorption interface, as described earlier [65].

C. For Nickle

A flow through photoreactor, consisting of a 6 m length of 1.1 mm i.d.×1.7 mm o.d. polytetrafluoroethylene (PTFE) tubing (Cole Parmer Instrum. Co., Vernon Hills, Ill.) wrapped around a low-pressure Hg vapor UV lamp (254 nm, 15 W, Cole Parmer, USA) was constructed. A schematic of this system is illustrated in FIG. 1. Samples were propelled through the tubing with the aid of a Minipuls 2 peristaltic pump (Gilson, Middleton, Wis.) operating at a speed of 50 rev min$^{-1}$, corresponding to a solution flow rate of 2 mL min$^{-1}$ and solution irradiation times of 4 min. UV vapor generation was accomplished in a continuous-flow mode as the sample was passed through the PTFE tube for irradiation. A 55 mL min$^{-1}$ flow of He purge gas was introduced into a gas-liquid separator, where the effluent from the UV photoreactor was directly merged with the He flow. The resultant volatile species were transported by the He flow from the gas-liquid separator either directly to an air-acetylene flame via a 10 cm length of PTFE transfer tubing for detection by atomic absorption spectrometry, or through an intermediate cryogenically cooled U-shaped glass condensation tube for collection and subsequent characterization.

A Perkin Elmer Model Aanalyst 100 flame Atomic Absorption Spectrometer (F-AAS) fitted with flame atomizer and a Perkin-Elmer hollow cathode nickel lamp was operated under the following conditions: wavelength, 232.0 nm; slit setting, 0.2 nm; current, 18 mA; acetylene flow rate, 3 l min$^{-1}$; air flow rate, 10 l min$^{-1}$. Simultaneous deuterium background correction was applied to all measurements. Both peak-height and integrated absorbance measurements were recorded. An IRIS inductively coupled plasma optical emission spectrometer (Thermo Jarrell Ash Co.) was employed to confirm all results obtained by F-AAS as it offers improved detection limits. Relevant plasma and detection operating parameters are as follows: Rf power 1150 W;

outer Ar gas flow rate, 14 l min$^{-1}$; intermediate Ar gas flow rate 0.8 l min$^{-1}$; Ar carrier gas flow rate, 0.38 l min$^{-1}$; Ni wavelength, 231.6 nm.

Measurements were made in a continuous on-line mode to characterize the yield of the reaction products and also in an off-line manner to trap the volatile species in an effort to subsequently characterize them via GC-MS and GC-ICP-MS techniques. For this latter purpose, a series of cryogenically cooled pyrex U-tube traps (0.8 cm o.d.×0.6 cm i.d.×13 cm deep×4 cm across) were occasionally placed between the generator and the detector to condense the generated analyte species, as described below.

In order to avoid clogging of the cryogenically cooled pyrex U-tube and possible decomposition of any volatile Ni compounds by concomitant water, a dry ice-methanol trap (−78° C.), into which a "guard" pyrex U-tube (1.7 cm o.d.×1.5 cm i.d.×13 cm deep×6 cm across) was immersed to remove any water vapor carried over from the UV photochemical reaction system was used. Following completion of the reaction, the dry ice-methanol bath was removed from the first U-tube which was then maintained at ambient temperature for 5 min such that any collected volatile nickel compounds could be transferred to the second U-tube where they were re-deposited under liquid $N_2$ bath temperatures. The second U-tube, packed with glass wool and immersed in liquid nitrogen (−196° C.), was thus used for trapping the volatile species swept from the dry ice bath. Continuous on-line monitoring of the AAS signal revealed that the volatile nickel species were completely trapped in this second U-tube. High purity Helium was chosen as the carrier gas as it is not condensed in the U-tube at liquid nitrogen temperatures and does not introduce any mass spectral interference during the subsequent identification of trapped species using GC-ICP-MS and GC-MS. Prior to commencing the trapping experiment, the U-tubes were flushed with He for 10 min at room temperature.

A Hewlett-Packard (HP) model 6890 gas chromatograph was interfaced to an HP 5973 mass selective detector (mass range 60-270 Daltons). Nickel compounds were separated on a 30 m×0.25 mm i.d.×0.25 mm film (J&W Scientific) DB1 capillary column (1% phenyl, 99% polydimethylsiloxane) using UHP helium carrier gas and a head pressure of 12.5 psi. Splitless sample injection was used. Sample aliquots of 250 µL were manually injected. The transfer line temperature was 40° C. A carrier gas flow rate was set at 1.2 mL min$^{-1}$. An 18-minute temperature program was used with an initial temperature of 30° C. and a hold time of 10 minutes followed by a ramp of 60° C. min$^{-1}$ to a temperature of 280° C., which was held for 10 minutes.

A Perkin-Elmer SCIEX ELAN 6000 (Concord, Ontario, Canada) ICP-MS instrument was interfaced to a Varian 3400 GC (Varian Canada, Georgetown, Canada) equipped with a 15 m length of DB-1 column (0.32 mm) through an in-house heated transfer line. The sampling process and GC conditions were similar to those used above for GC-MS measurements. The ICP-MS was operated in accordance with the manufacturer's recommendations with the $^{60}$Ni and $^{61}$Ni isotopes selected rather than using the more abundant $^{58}$Ni for detection in order to eliminate possible isobaric inferences arising from ArO+.

Reagents and Samples

All solutions were prepared using 18 MΣ-cm deionized, reverse osmosis water (DIW) obtained from a mixed bed ion-exchange system (NanoPure, model D4744, Barnstead/ Thermoline, Dubuque, Iowa). Calibration solutions were prepared daily by diluting the stock solutions. Selenium stock solutions (1000 mg l$^{-1}$) were prepared from selenite ($Na_2 SeO_3$ 99%, Aldrich, USA); selenate ($Na_2SeO_4$ 99%, Aldrich); seleno-DL-cystine (SeCys, Sigma, USA) and seleno-DL-methionine (SeMet, Sigma). Nickel stock solutions (1000 mg L-1) were prepared from $NiCl_2$, $NiSO_4$, and $Ni(NO_3)_2$ (Aldrich, USA). Solutions of low molecular weight acids (LMW) were prepared from analytical reagent grade materials: formic acid (23 M, Anachemica, Canada), acetic acid (6.3 M, BDH, Canada), propionic acid (13 M, BDH) and malonic acid (BDH). Solutions of $H_2O_2$ were prepared from 30% $H_2O_2$ (9.8 M, Anachemica). High purity $HNO_3$, $NaNO_3$ and $NaNO_2$ (Fisher Scientific) were used, except where indicated otherwise. Titania (TiNano 40 HPC-D, 99% pure) was obtained from Altair technologies, Inc, (Nevada).

Samples of Ottawa River water were obtained as needed from the shore of the river by sampling aliquots into precleaned polypropylene bottles and directly transporting them to the laboratory for immediate study. Certified Reference Material CASS-4 (coastal seawater) was obtained from the National Research Council of Canada, Ottawa and used to investigate the possible generation of volatile selenium compounds from this natural saline matrix. A second sample of deep-ocean water obtained from the North Atlantic from a depth of 1000 m was also used for some recovery experiments.

Procedure

The gaseous metallic or elemental products generated in the photochemical reactor (3) were separated from the liquid phase in the gas-liquid separator (6) and flushed to the detector so as to determine optimal generation conditions, or passed through the successive U-tube traps (8, 9) using a stream of He carrier gas for ultimate collection. Following cryocondensation, the U-tube in the second trap (9) was closed at both ends by stoppers containing rubber septa, removed from the liquid nitrogen bath and allowed to equilibrate to room temperature for about 15 min. A 250 µL volume of the volatile sample was drawn through the septum of the U-tube, using a gas-tight syringe, and injected into the GC-MS for species identification.

Volatile selenium compounds were generated when the selenium standard solutions containing various LMW acids at different concentrations were pumped through the PTFE tubing of the photoreactor. The gaseous products were separated from the liquid in the gas-liquid separator and flushed into the heated quartz tube atomizer for AAS measurements so as to determine optimal generation conditions, or passed through the successive U-tubes using a stream of He carrier gas. Following cryocondensation, the second U-tube was closed at both ends by stoppers containing rubber septa, removed from the liquid nitrogen bath and allowed to equilibrate to room temperature for about 15 min. A 250 uL volume of the volatile Se species was sampled through the septum of the U-tube, using a gas-tight syringe, and injected into the GC/MS for species identification.

Volatile nickel compounds were generated when the nickel standard solutions containing various LMW acids at different concentrations were pumped through the PTFE tubing of the photoreactor. The gaseous products were separated from the liquid phase in the gas-liquid separator and flushed into the air-acetylene flame for AAS detection, ICP-OES detection, or passed through the successive U-tubes using a stream of He carrier gas. For the latter approach, following cryocondensation, the second U-tube was closed at both ends by rubber septa, removed from the liquid nitrogen bath and allowed to equilibrate to room temperature for about 15 min. A 250 μl volume of the gas phase containing the volatile Ni species was sampled through the septum of the U-tube using a gas-tight syringe and injected into the GC-MS for species identification.

Results and Discussion

A. Selenium

Initial experiments were undertaken using a solid phase microextraction fiber (SPME) inserted into the headspace of a silicone septum-sealed vial into which a 4 W low-pressure penlight mercury lamp had been mounted (sheathed in a closed quartz finger). The vial was spiked with a solution of approximately 10 ml DIW containing 0.7 M formic acid to which 10 mg of $TiO_2$ was added, in accordance with the protocol described by Kikuchi and Sakamoto [62]. A multielement spike was then added at a nominal concentration of 0.5 pm. Following exposure of the batch sample to the UV source, the volatile contents of the headspace were sampled with the SPME fiber and subsequently desorbed into the ICP-TOF-MS using the heated desorption cell directly connected to the base of the torch. Full spectrum scans acquired during the desorption transient revealed the presence of volatile forms of Pb, As, Hg, Sb, Sn and Se.

Preliminary experiments revealed that the presence of $TiO_2$ in the reaction cell was completely unnecessary for the generation of a volatile selenium product. Formic acid was thus initially investigated for its effects on the photochemical generation of volatile selenium species, as it has the simplest structure among the organic acids studied. The UV generation efficiency was found to be dependent on the acidity under which the reaction is performed, as shown by the data in FIG. 2. A plateau in the range of 0.4~1.0 M HCOOH is evident. Additional studies have revealed that the optimum acidity range can be shifted to higher values (up to 2 M formic acid) by utilizing an increased irradiation time. In this work, it was determined that for 0.7M formic acid an appropriate irradiation time is 2 min. Higher concentrations (more than 2 M) of HCOO—, supplied either as formic acid or sodium formate, resulted in a decrease in signal response from volatile Se species. By maintaining the pH<5 with the use of $H_3PO_4$, a similar Se response could be obtained when HCOONa was used as the source of formate anion, as opposed to HCOOH. No signal was observed at pH values higher than 5. It should be noted that, in the presence of $H_2O_2$, (appropriate concentration is in the range 20~100 mM), and, the volatile selenium species can be formed even if the concentration of formic acid is very low (down to 20 mM, for example). Although the role played by $H_2O_2$ is yet unclear, decomposition of $H_2O_2$ under UV irradiation likely produces an increase in OH radicals, favoring increased attack of the formic acid as compared to the case when a pure 0.7 M solution of formic acid alone is used. Addition of NaCl (in the range of 0~0.5 M), HCl (0~0.3 M), $NH_4Cl$ (0~0.5 M), $H_2SO_4$ (0~0.1 M) or $H_3PO_4$ (0~0.5M) had no noticeable effect on the generation efficiency of the measured Se species.

Figure 3:
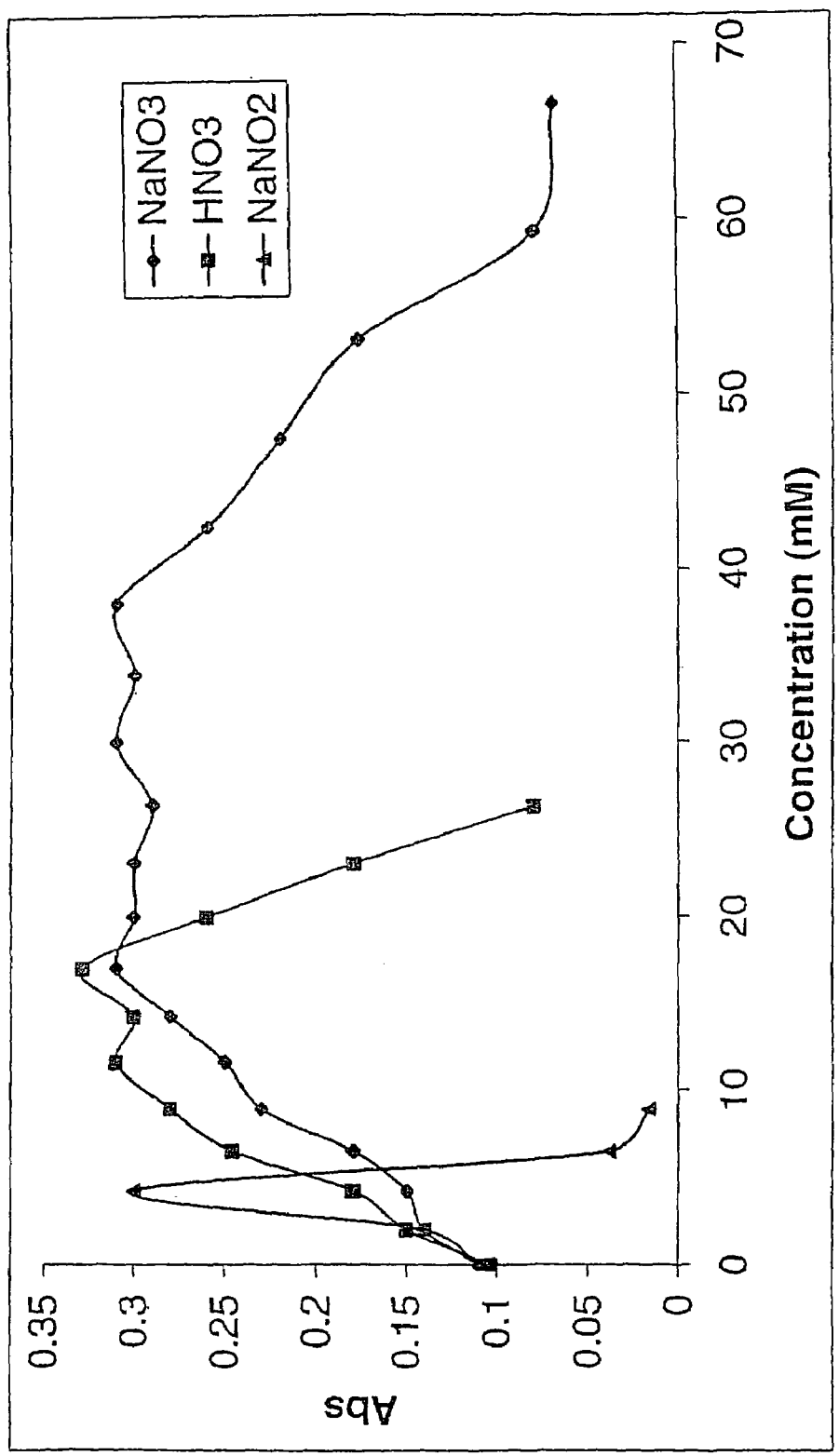
FIG. 3. Effects of $NaNO_3$, $HNO_3$ and $NaNO_2$ on the AAS signals arising from the continuous photochemical treatment of solutions containing 0.1 mg/liter Se(IV).
Figure 4:
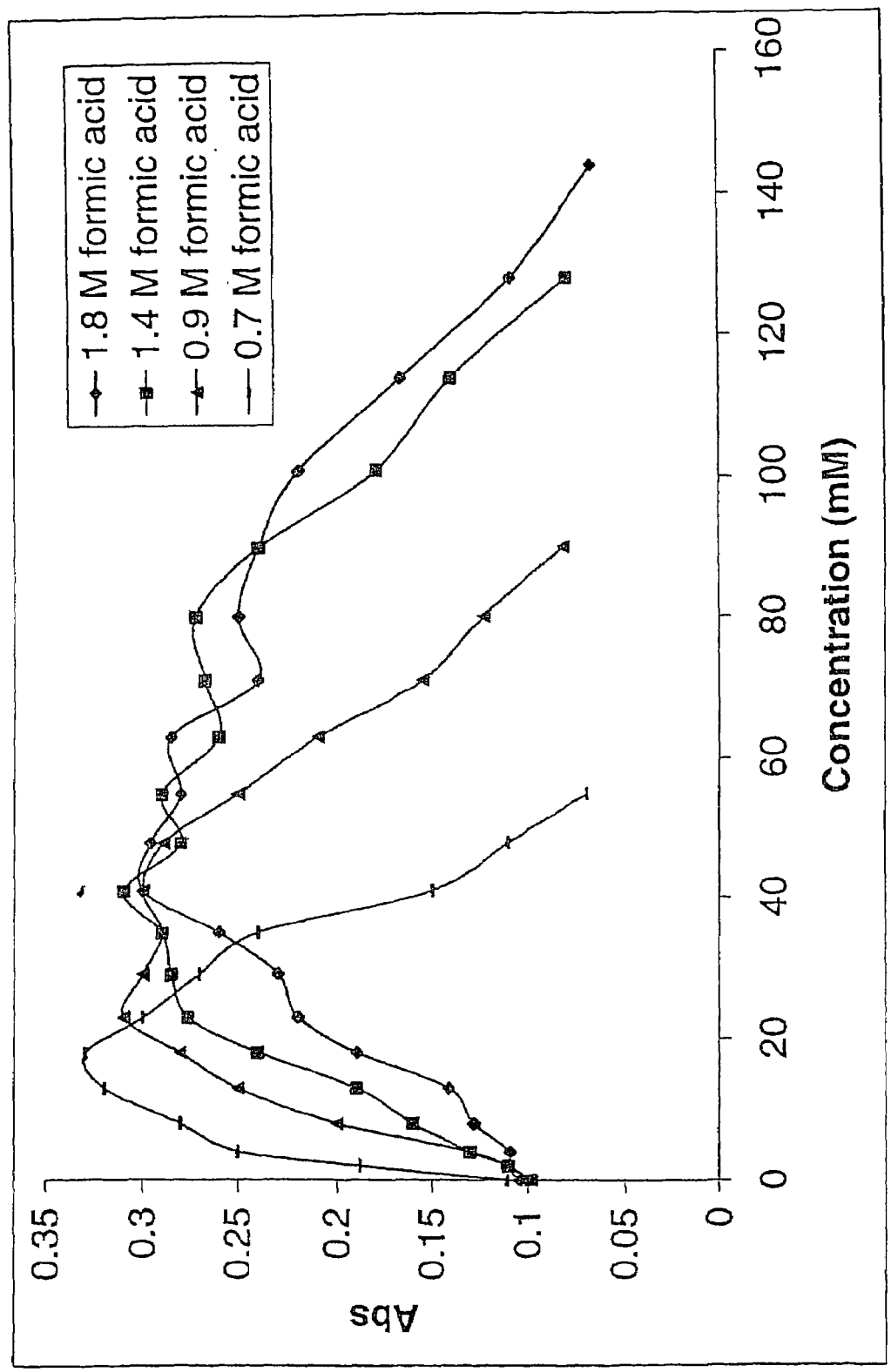
FIG. 4. Effects of the concentration of formic acid on the AAS signals arising from the continuous photochemical treatment of solutions containing 0.1 mg/liter Se(IV).

Nitric acid was found to give rise to a three-fold enhancement in the generation efficiency of the selenium species. In order to elucidate the positive role-played by nitrate ions, as opposed to increased acidity derived from the nitric acid, sodium nitrate and sodium nitrite were investigated by studying their effect on signal generation from a 0.1 mg l$^{-1}$ of Se(IV) in a 0.7 M solution of formic acid. Results are displayed in FIG. 3, from which it may be concluded that the signal intensity is greatly increased by the simple presence of the $NO^{3-}$ anion. The concentration of $NO^{3-}$ depends on the concentration of formic acid used. For example, using a 0.5 M solution of formic acid, the concentration of $NaNO_3$ needed for enhancement is 10~30 mM; with a 1.5 M solution of formic acid, this range is extended to 25~80 mM $NaNO_3$, as shown in FIG. 4.

Allmand and Reeve [66] demonstrated that formic acid may follow either of two different pathways during its photoytic decomposition, independent of the wavelength of the absorbed radiation, i.e.:

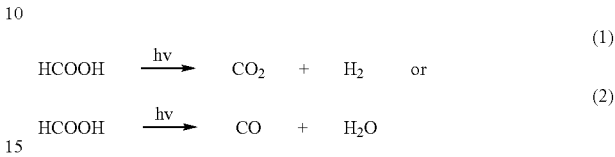

Reaction 1 occurs approximately six-fold more frequently than the second. Although various ratios of $(CO_2+H_2):(CO+H_2O)$ have been obtained for the photochemical reaction products by several independent observations [67], $H_2$ and CO are clearly generated as products of these photochemical reactions. Hydrogen and carboxyl radicals generated by UV irradiation of formic acid can, theoretically, reduce selenite ($Se^{4+}$) to amorphous selenium $Se^0$, and ultimately to more volatile selenide hydride or selenium carbonyl (SeCO). When $TiO_2$ is present as a photocatalyst, production of $H_2Se$ has been confirmed [62].

In an effort to distinguish whether selenium hydride or other carbon-bonded selenium compounds are generated in the photoreactor, the volatile species were swept from the gas-liquid separator and subsequently bubbled through a solution of NaOH (at concentrations of 0.1, 0.5, 2 or 4 M) prior to entering the quartz tube atomizer. It is known that $H_2Se$ is easily decomposed and can be completely absorbed in such an alkaline solution [68], whereas other carbon-bonded selenium compounds are generally regarded as sufficiently stable to pass unimpeded through such a trap [69]. The resulting AAS signals revealed that, in all the cases tested, about 60~70% of the volatile selenium species was absorbed by this alkaline solution. Furthermore, the ratio of species absorbed to species passed was independent of the NaOH concentration. This implies that a fraction (about 60~70% v/v) of the volatile selenium species produced and absorbed by the NaOH solution is $H_2Se$. The remaining species (30~40% v/v) are likely Se—C bonded compound(s). More interesting was the observation that, in the presence of 10 mM $NaNO_3$, all of the photochemical reaction products passed completely through the alkaline absorbing solution without loss, suggesting that $H_2Se$ was no longer a product of the reaction.

Figure 5A:
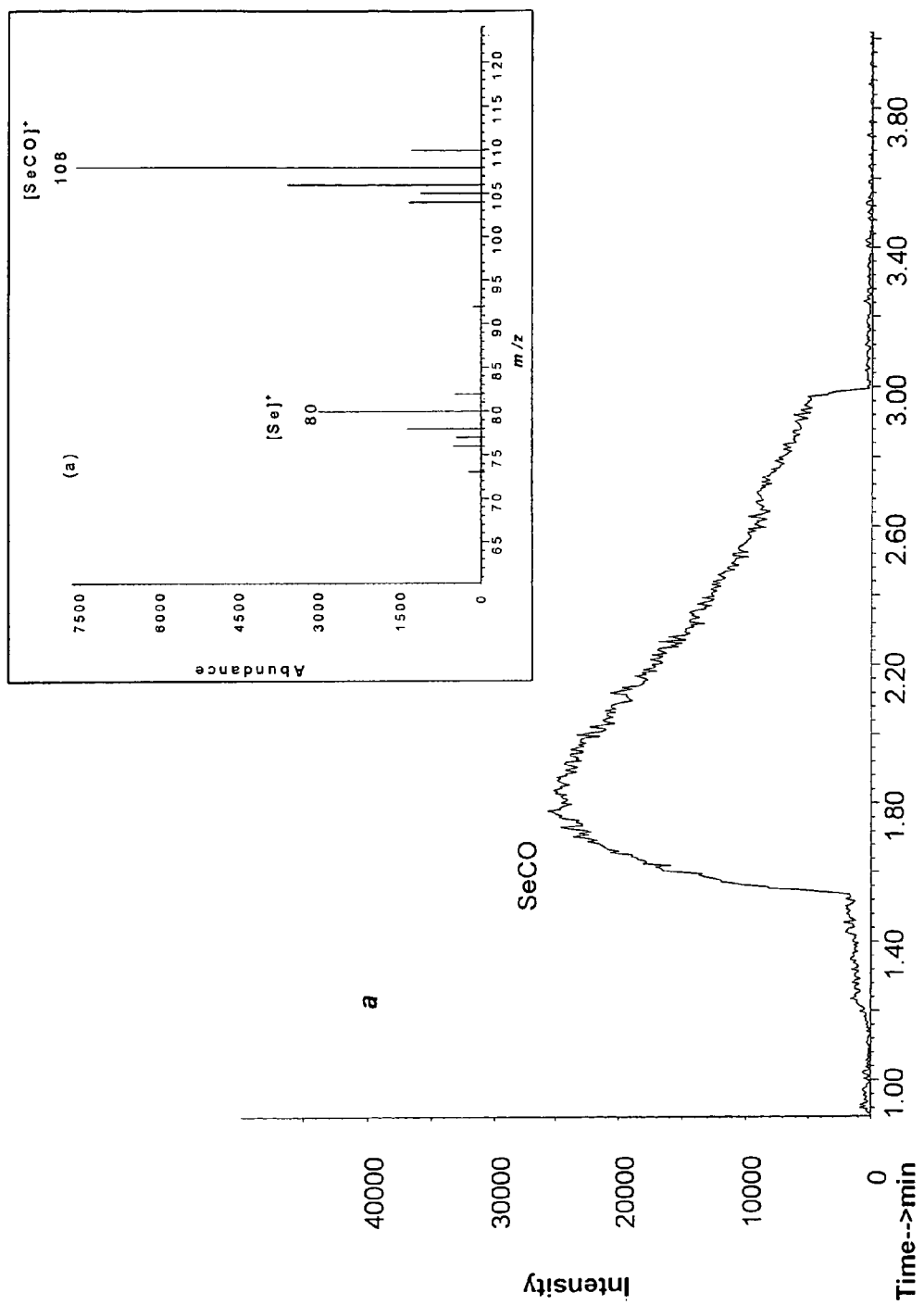
FIGS. 5a-5d GC/MS spectra arising from sampling of cryogenically trapped volatile Se compounds produced by UV irradiation of solutions containing: (a) 0.1 mg l-1 Se(IV), 10 mM $NaNO_3$ and 0.7 M HCOOH; (b) 0.1 mg l-1 Se(IV), 0.7 M $CH_3COOH$; (c) 0.1 mg l-1 Se(IV), 0.7 M $HOOCH_2COOH$; (d) 0.1 mg l-1 Se(IV), 0.7 M $CH_3CH_2COOH$. Main panel presents the total ion chromatogram, inset illustrates mass spectrum arising from the peak.

The volatile species resulting from subjecting a 1 liter volume of sample containing 0.1 mg l$^{-1}$ Se(IV), 10 mM $NaNO_3$ and 0.7 M HCOOH to UV irradiation were cryogenically trapped, as described earlier. Introduction of a sub-sample of the collected gas phase into the GC-ICP-MS resulted in the detection of only one selenium-containing peak. Results from subsequent GC-MS measurements on this same sample are presented in FIG. 5a. Fragments containing Se are easily recognized in the mass spectra as a result of their characteristic isotopic pattern [$^{74}$Se (0.89%), $^{76}$Se (9.37%), $^{77}$Se (7.63%), $^{78}$Se (23.77%), $^{80}$Se (49.61%), and $^{82}$Se (8.73%)] arising from the six natural selenium isotopes present in the chromatographic peak at 1.6~3.0 min. This isotope pattern is evident in fragments for Se+ at m/z 80 and SeCO+ at m/z 108. The resulting fragmentation pattern is consistent with the reported mass spectrum of SeCO [70]. Identical results (a retention time of 2 min for the chromatographic peak and for the SeCO mass spectral pattern) were obtained on treating a solution containing 0.1 mg l-1 Se(IV) and 0.7 M HCOOH without added nitrate anion, although the intensity was much lower in comparison with that arising from a solution containing nitrate anions. No peak corresponding to $H_2Se$, which was expected to appear as a reaction product, was obtained in these experiments, likely as a consequence of the instability of this molecule and its decomposition during transport through the chromatographic column.

From the above, it is clear that about 60~70% (v/v) $SeH_2$ and 30~40% (v/v) SeCO are photochemically produced by irradiation of inorganic selenium in the formic acid solution. Very little information is currently available documenting nutritional and toxicity properties of selenium carbonyl (SeCO) when released into the environment because it has only been formed in the laboratory under very critical conditions and with poor yield by passing carbon monoxide over the element at 400° C. [71], or by reaction of aluminum selenide with carbonyl chloride at 219° C. [72]. However, selenium hydride is a well known toxic gas having a very offensive odor. As an inhibitor of terminal cytochrome oxidase, it is 100-fold more toxic than hydrogen cyanide [73-75]. Nitrate anion serves as a "photochemical detoxic switch", not only producing a three-fold increase in the yield of SeCO, but also completely inhibiting the formation of extremely toxic $SeH_2$.

Figure 2:
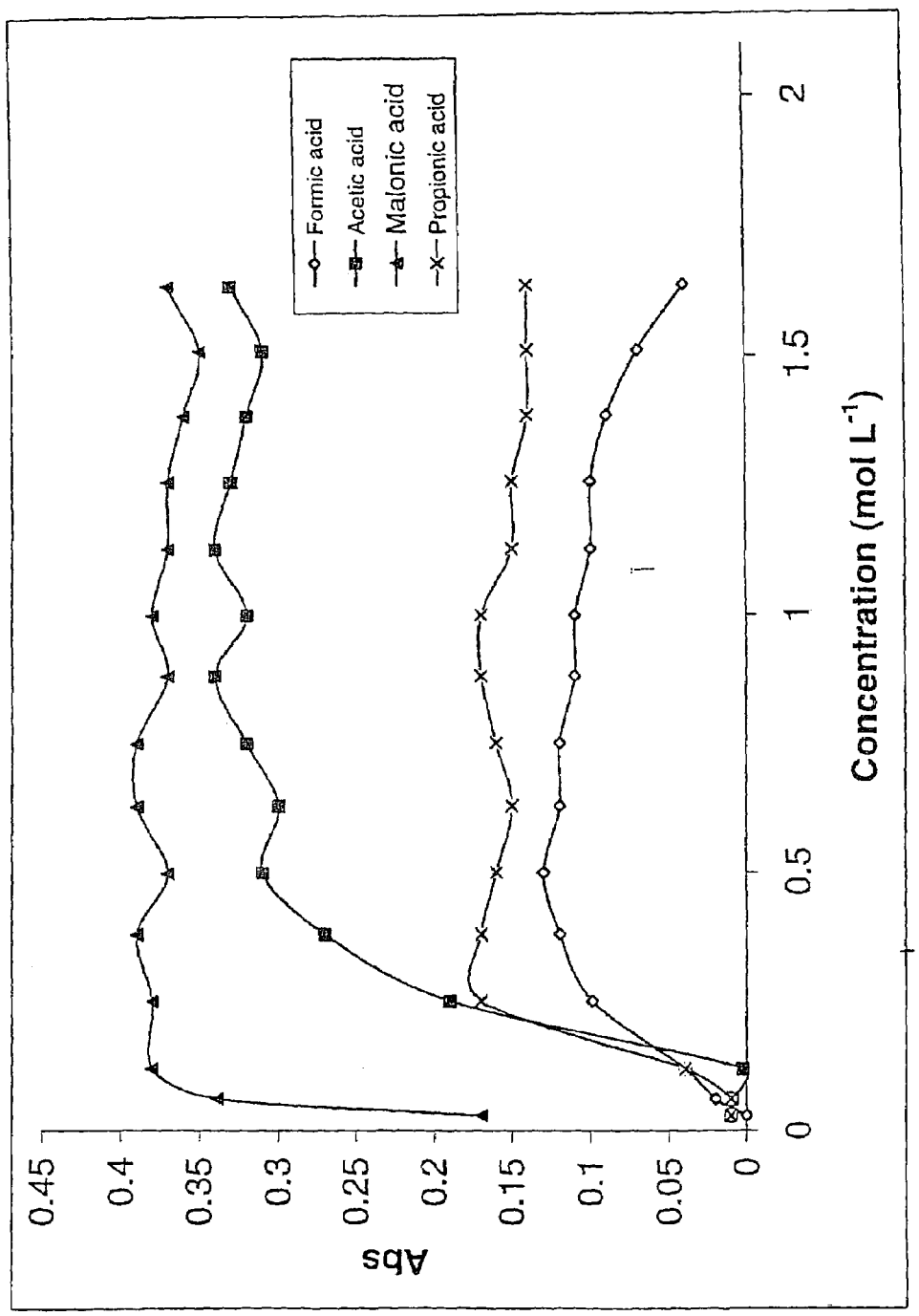
FIG. 2. Effects of the concentration of low molecular weight organic acids on the AAS signals arising from the continuous photochemical treatment of solutions containing 0.1 mg/liter Se(IV).
Figure 5B:
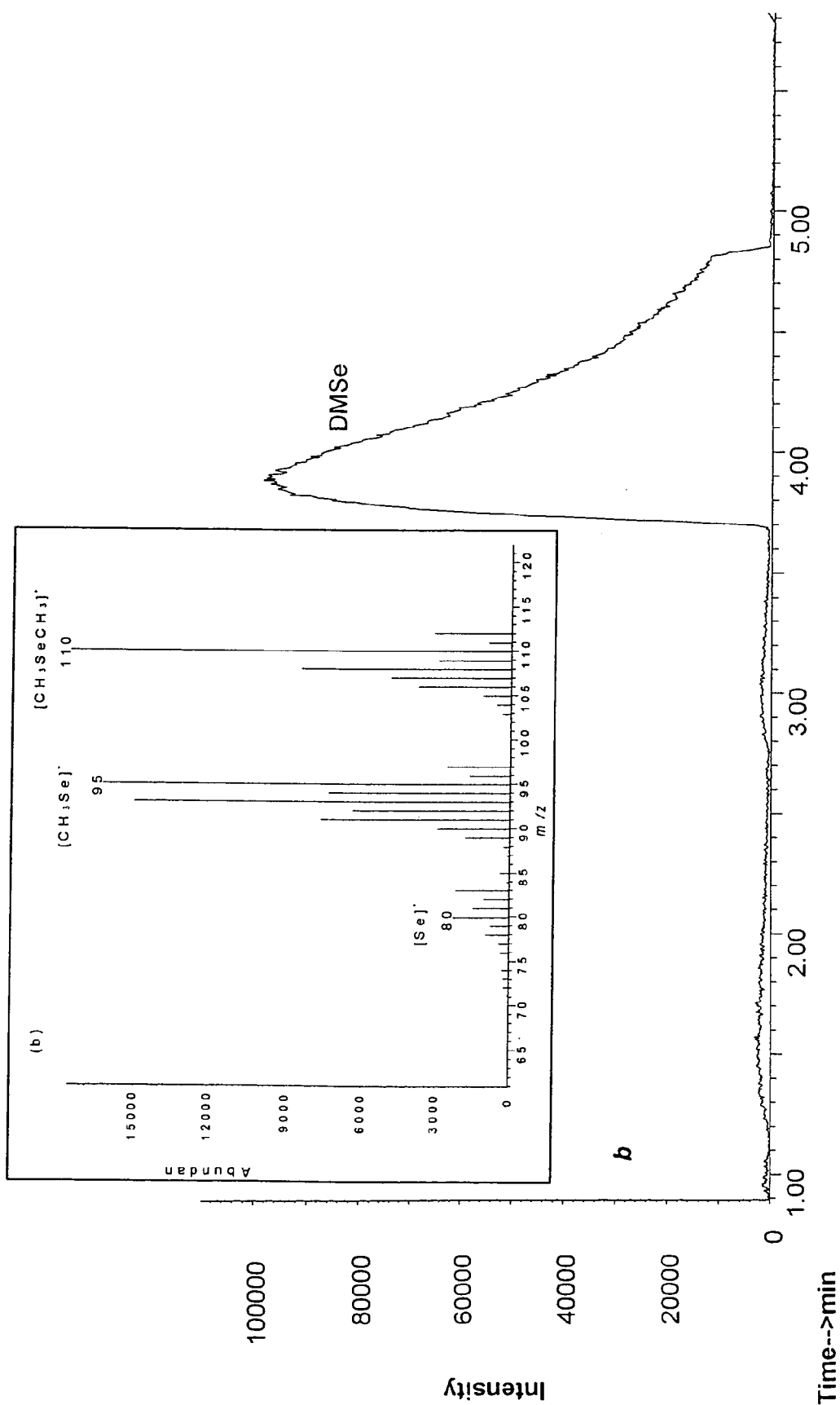

Compared to the formic acid system, acetic acid can be more easily used to generate volatile selenium compounds under UV irradiation. The effects of acid concentration on the intensity of the AAS signal for a solution containing 0.1 mg $l^{-1}$ $Se^{4+}$ are shown in FIG. 2. Increasing the concentration of acetate ion (as sodium acetate or acetic acid), even to the point of saturation ([Ac-]>30% w/v), produced no notable negative effects on the Se signal intensity, provided the pH of the reaction solution was maintained slightly acidic (i.e., pH<5). Furthermore, enhancement effects on the Se signal intensity earlier obtained by the addition of $H_2O_2$ or $NaNO_3$ were no longer observed as a consequence of the higher efficiency of generation of volatile species compared to the case with the formic acid system. In contrast to this, when the concentrations of these weak oxidizing reagents were higher than 0.1 M for $H_2O_2$ and 20 mM for $NaNO_3$, the selenium signal rapidly decreased to almost zero, even though the concentration of acetic acid was increased. The NaOH trapping solution was not effective in absorbing any fraction of the volatile reaction products. In such case, only one selenium-containing compound was detected by GC-ICP-MS. Detailed information illustrating the structural identification of the cryogenically trapped compound by GC/MS is shown in FIG. 5b. Only one peak, at 3.7~4.6 min, contains Se. Mass spectra shown in FIG. 5b show the molecular ion $[CH_3—Se—CH_3]+$ at m/z 110, as well as fragmentation peaks $[CH_3—Se]+$ at m/z 95 and at m/z 80 $[Se]+$. This mass spectrum agrees well with previously published mass spectra of pure DMSe [76]. DMSe is produced from the trimethylselenonium ion during hydride generation [77] and from bacterial cultures [42, 45, 78]. It may be concluded that the volatile selenium containing species produced by UV photolysis of selenite in acetic acid solution is dimethylselenide $(CH_3)_2Se$. It is probable that the negative influence derived by the presence of higher concentrations of $H_2O_2$ or $NO_{3-}$ is due to subsequent reactions between DMSe and the hydroxyl or nitrate radicals. This results in loss of DMSe due to formation of the much less volatile methaneselenic acid ($CH_3SeOH$), dimethyl selenoxide and corresponding salts [79].

Figure 5C:
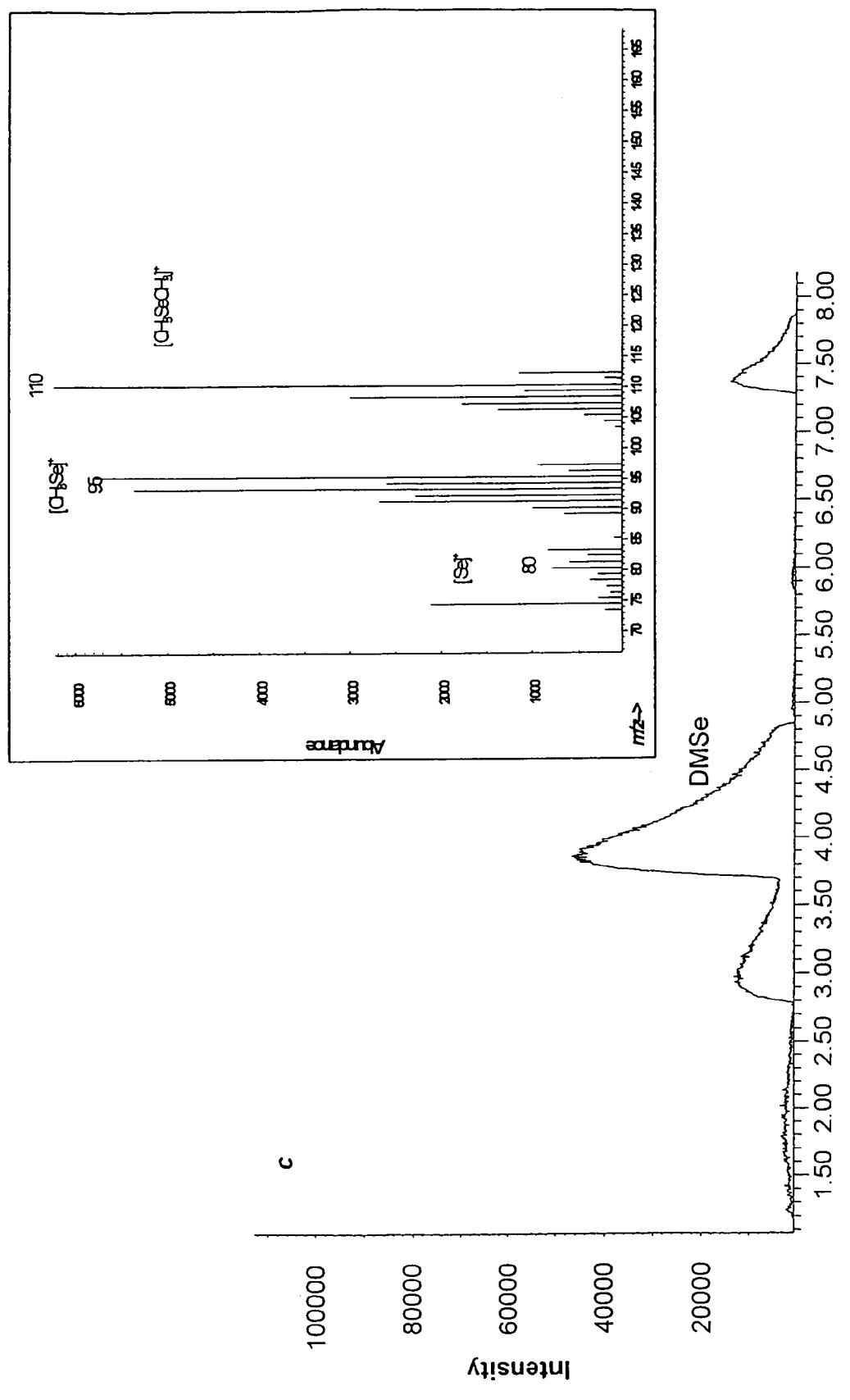

In addition to acetic acid, dimethylselenide could also be generated from a malonic acid solution. A chromatogram and a mass spectrum illustrating the composition of the products are shown in FIG. 5c. The conditions for generation of DMSe from a malonic acid medium are very similar to those used with acetic acid (cf. FIG. 2). This might be attributable to the .CH2COOH radical, acetic acid, as well as $CO_2$ produced by UV irradiation [80]. In addition, a higher DMSe generation efficiency was obtained and a shorter irradiation time could be used as compared to conditions arising from use of acetic acid. In a malonic acid medium, the UV irradiation time for production of DMSe could be as short as 17 seconds, and the entire reaction could be completed within 40 seconds, whereas at least 2 min were needed with the other systems.

The photochemical efficiency for alkylation was estimated from a comparison of the resulting AAS signals with those arising from conventional generation of $H_2Se$ using a $NaBH_4$—HCl hydride generation system. More than 50% of the inorganic selenium was transformed to volatile dimethylselenium in the malonic acid solution using a 2 min UV irradiation. A similar transformation efficiency was obtained with an acetic acid generation medium.

Figure 5D:
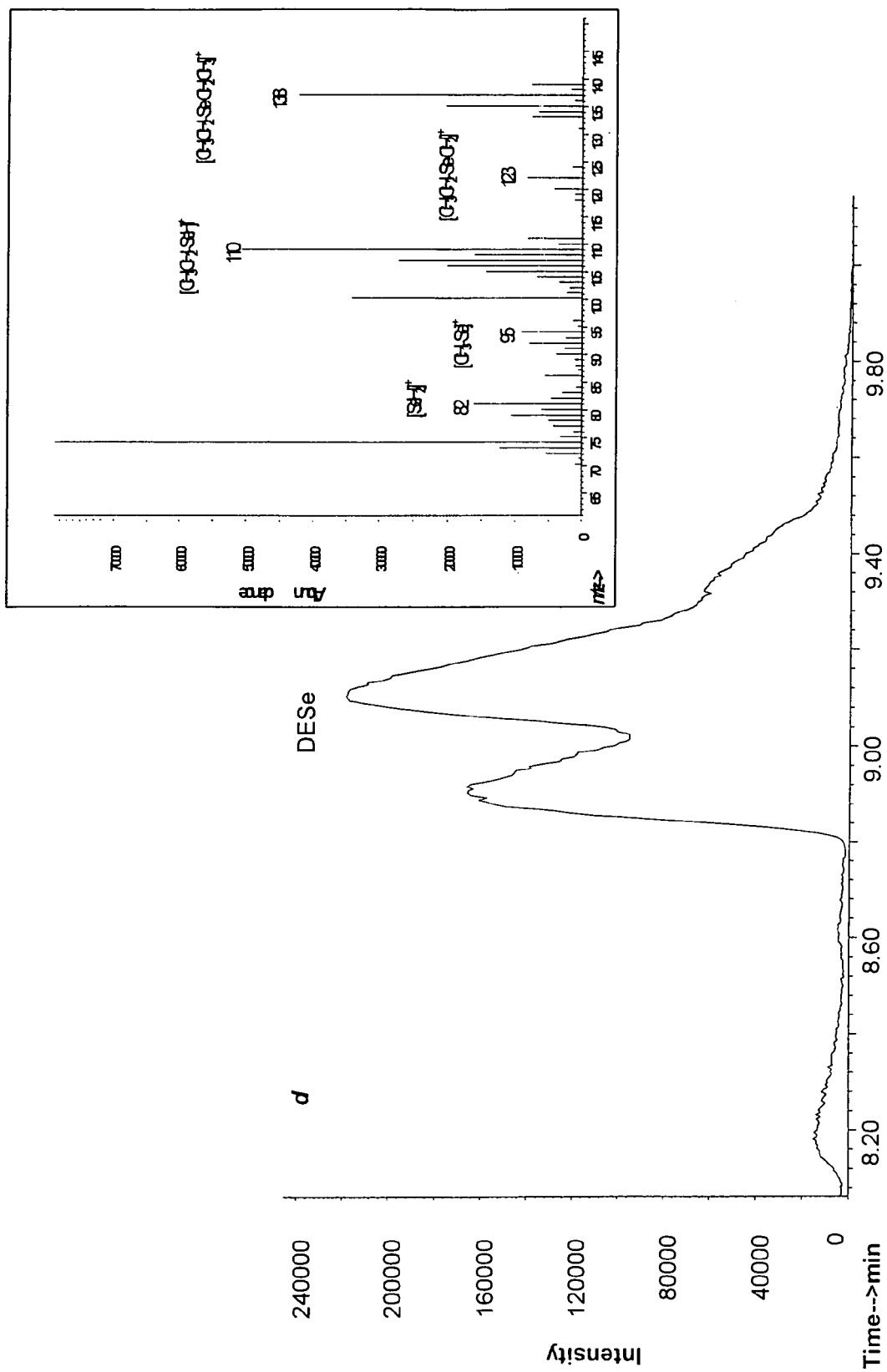

UV irradiation of a propionic acid solution containing inorganic selenium also resulted in the generation of a volatile selenium-containing product (cf. FIG. 2). Only one chromatographic peak containing selenium and having a retention time of 9.10~9.30 min was obtained and its mass spectrum is presented in FIG. 5d. A molecular ion at m/z 138 $[CH_3CH_2—Se—CH_2CH_3]+$, and several probable fragmentation peaks at m/z 123 $[CH_3CH_2—Se—CH_2]+$, m/z 110 $[CH_3CH_2—SeH]+$, m/z 95 $[CH_3—Se]+$, m/z 82 $[SeH_2]+$ and at mz 80 $[Se]+$ are evident and are consistent with the reported mass spectrum of diethylselenium (DESe) $[(CH_3CH_2)_2Se]$ [70]. An unidentified peak which appears as a shoulder having a retention time of 8.82~9.12 min (with peaks at m/z 101 and m/z 75) is not a selenium containing compound as there is no associated characteristic isotopic pattern evident.

Attempts were made to photo-generate volatile selenium species using selenate ($Se^{6+}$); these were unsuccessful with all LMW acids investigated. A very small quantity of volatile selenium containing compound(s) was produced from several organo-selenium species tested, including seleno-DL-cystine, and seleno-DL-methionine. Due to the relatively low yields of these products, further studies/identification were not pursued.

Unlike the batch methods, where the problem of temperature control may become a serious problem when using photochemical reactors, continuous flow systems generally do not suffer from this drawback because the residence time of the sample in the PTFE reactor tube is quite short (only 2 min in these experiments). However, during UV irradiation the sample temperature increased from 24° C. to about 40° C. The effect of temperature (range 10-60° C.) on the response was therefore studied. The sample solution [Se (IV), 0.1 mg $l^{-1}$] was maintained in either a NaCl ice bath (−3° C.) or a hot water bath (80° C.) for 10 min prior to sampling. No effect of temperature on the response was observed. Further investigations were done in an effort to distinguish photochemical effects from "thermal" effects. When the UV lamp was covered with a thin sheet of aluminum foil placed between it and the PTFE reactor tubing, the thermal effect was still present whereas UV irradiation of the sample was prohibited. In such case, volatile selenium species were no longer formed.

The efficiency of photochemical alkylation depends on the concentration of selenium, and the time used for irradiation. The use of a lower selenium concentration permitted shorter irradiation times to be used. As an example, complete transformation of 0.020 mg l$^{-1}$ Se (IV) to volatile product required a 20 second irradiation time whereas for a Se(IV) concentration of 0.20 mg l$^{-1}$, at least 1.5 min was needed. When 100~1000 mg l$^{-1}$ concentrations of Se (IV) were investigated, no volatile product could be detected, rather a visible, red colored product (most probably amorphous Se$^0$) was deposited onto the inner surface of the reactor tubing. Such deposits have occasionally been noted in biological systems undergoing methylation [36, 38, 82-83], such as with the anaerobe *Enterobacter cloacae* SLD1a-1, which produces DMSe. The efficiency of volatilization of Se in such cultures obeyed an inverse relationship to the Se concentration. The greatest amount of DMSe was produced at a SeO32-concentration of 10 µM (0.80 mg l$^{-1}$); at SeO$_3^{2-}$ concentrations of 0.1 and 1.0 mM (8 and 80 mg l$^{-1}$), *E. cloacae* SLD1a-1 volatilized 1.8- and 11.3-fold less Se, respectively, than at 10 µM [84]. At such concentration, many hours of UV irradiation may be required, which may more efficiently be achieved using a batch reactor rather than a flow system.

Although the detailed reaction sequence is yet unclear, based on the above results, the following simplified general reaction is proposed:

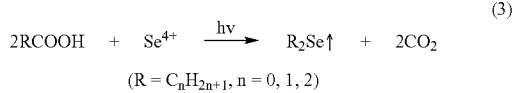

(3)

(R = C$_n$H$_{2n+1}$, n = 0, 1, 2)

wherein the bond between the a-carbon and the carboxyl group is severed. The energy required to break the C—C bond is 84 kcal mol-1; breaking the C—OH bond requires 90 kcal mol-1 [85]. These energies are equivalent to UV wavelengths of 341 nm and 316 nm, respectively. Thus, most UV-B (280-320 nm) and some UV-A (320-420 nm) radiation can deliver more energy than needed to sever the C—C and C—OH bonds and is conveniently available from solar radiation.

Table 1 summarizes data obtained detailing the recovery of Se(IV) spikes added to the Ottawa River water, CASS-4 CRM seawater and the North Atlantic seawater samples. It was necessary to synthetically spike all samples with analyte because the endogenous concentrations were far below the detection limit obtained for Se using the quartz tube AAS technique. It is noteworthy that no recovery of the spike is seen in the undiluted seawater matrices. However, as the samples are diluted with DIW, reducing the salinity from its initial value of 30.7 parts per thousand (ppt) for CASS-4 and 34 ppt for the North Atlantic sample, the efficiency of generation rises. The reason for this is unknown at present and may be related to complexation of the Se(IV) by the chloride matrix. If LMW acids such as acetic and malonic are added to the undiluted sample, full recovery of the spike is achieved. By contrast, the Ottawa River water apparently already contains sufficient organic detritus (sample collected mid-summer) that simple, direct UV-irradiation suffices to yield significant generation efficiency. This supports the developed belief that natural water systems may be capable of efficient conversion of any Se(IV) present to volatile product in the presence of solar radiation.

TABLE 1

Production of volatile dimethylselenium species from natural water samples spiked with selenium (0.7 M acetic acid, detection of limits: 1.6 ngml$^{-1}$ of Se).

| Sample | Selenium contained (Se$^{4+}$, ngml$^{-1}$) | Selenium added (Se$^{4+}$, ngml$^{-1}$) | Selenium found ((CH$_3$)$_2$Se, ngml$^{-1}$) | Recovery (%) |
|---|---|---|---|---|
| Ottawa River water | <2 | 50 | 44.1 ± 2.3 | 88 |
|  |  | 100 | 85.6 ± 5.2 | 86 |
| MOOS-1 Seawater | n.d. | 100 | 0 | 0 |
|  |  | 100 | 15.9 ± 3.0 | 16 |
|  |  | 100 | (2 fold of dilution) | 41 |
|  |  | 100 | 41.2 ± 2.0 | 83 |
|  |  | 100 | (5 fold of dilution) 83.3 ± 4.0 | 43 |
|  |  |  | (10 fold of dilution) 43.1 ± 15.6 |  |
|  |  |  | (1.4 M acetic + 0.5 M malonic acids) |  |
| CASS-4 Seawater | n.d. | 100 | 0 | 0 |
|  |  | 100 | 30.5 ± 0.9 | 31 |
|  |  | 100 | (2 fold of dilution) | 105 |
|  |  | 100 | 104.9 ± 5.0 | 58 |
|  |  |  | (4 fold of dilution) 58.2 ± 2.8 |  |
|  |  |  | (1.4 M acetic + 0.5 M malonic acids) |  |

Removal of Se from contaminated water remains a difficult environmental problem. Two typical examples may be cited. Selenium contaminated agricultural drainage water from deep wells where a high level of selenium has accumulated from the surrounding rock was discharged into the Kesterson Reservoir marsh in California and resulted in the death and deformity of wildfowl due to Se poisoning [54, 88]. In a second case, the San Francisco Bay was seriously polluted by a large volume of selenium-laden effluent from six oil refineries [89], up to 3000 kilograms of selenium were flushed into the Bay every year [41]. Based on the volatilization of Se by plant and microbial action, a 36-hectare wetland located adjacent to the Bay was consequently constructed to remediate approximately 10 million liters of refinery effluent per day. At the Tulare Lake Drainage District at Corcoran, Calif., a second constructed wetland has been working in this manner for years [86, 90]. No doubt, constructed wetlands are orders of magnitude lower in cost than other treatment systems [91]. By way of this "biological volatilization" process, as much as 30% of the Se removed from drainage water moving through the Kesterson Ponds may have been released into the atmosphere through biological volatilization [69, 92]. Analysis of the wetland inlet and outlet waters showed that the constructed wetland at San Francisco Bay was successful in removing at least 70% of the Se from oil refinery effluents passing through it [93], some 10-30% of the Se was removed by volatilization to the atmosphere. It is believed that the Se removed in this manner cannot enter the local food chain where it may once again become toxic to wildlife and humans [53]. The volatile Se formed in wetlands is mainly in the form of DMSe and is thus relatively nontoxic [32, 94-95]. Furthermore, on entering the atmosphere it is dispersed and diluted by air currents directed away from the contaminated areas, with re-deposition possibly occurring in Se-deficient regions [51, 96] where it may ultimately serve as an important nutrient [97-98].

This raises the question about the dangers of selenium volatilized into the environment under such conditions. In the case of Chevron's oil industrial wetland, an estimated 900 kilograms of selenium are released into the surrounding atmosphere and spread to neighbouring areas each year without knowledge of its effect or whether exposure to such substances may be hazardous. Although DMSe is considered one of the least toxic forms of Se, its toxicity can be substantially increased when animals are co-exposed to sub-toxic levels of arsenic or mercury [99-100]. Low concentrations of arsenic, mercury and other heavy metal ions frequently co-exist with Se in contaminated water and also produce methylated compounds along with the bio-methylation of selenium. These byproducts may pose a chronic danger to public health. Although it is hoped that the volatilized selenium will re-deposit in Se-deficient areas, thereby supplying added nutrients, once the Se flux enters the atmosphere the fate of DMSe and DMDSe is beyond control. Predictable pollution caused by random accumulation of selenium in some places remains to be seen.

As an alternative, photochemical alkylation may present the ultimate solution to the problem of remediation of contaminated waters. According to results presented in this study, specific organometallic compounds could be synthesized by selecting the appropriate LMW acid as a reagent. Industrial wastewater could then be economically treated by UV irradiation. The volatile products so produced could be easily collected and subjected to recycling rather than directly released into the atmosphere. The entire process could be accomplished under controlled conditions. Following UV irradiation and "disinfection", the effluent could be disposed of with low risk to the environment.

B. Nickel

Figure 6:
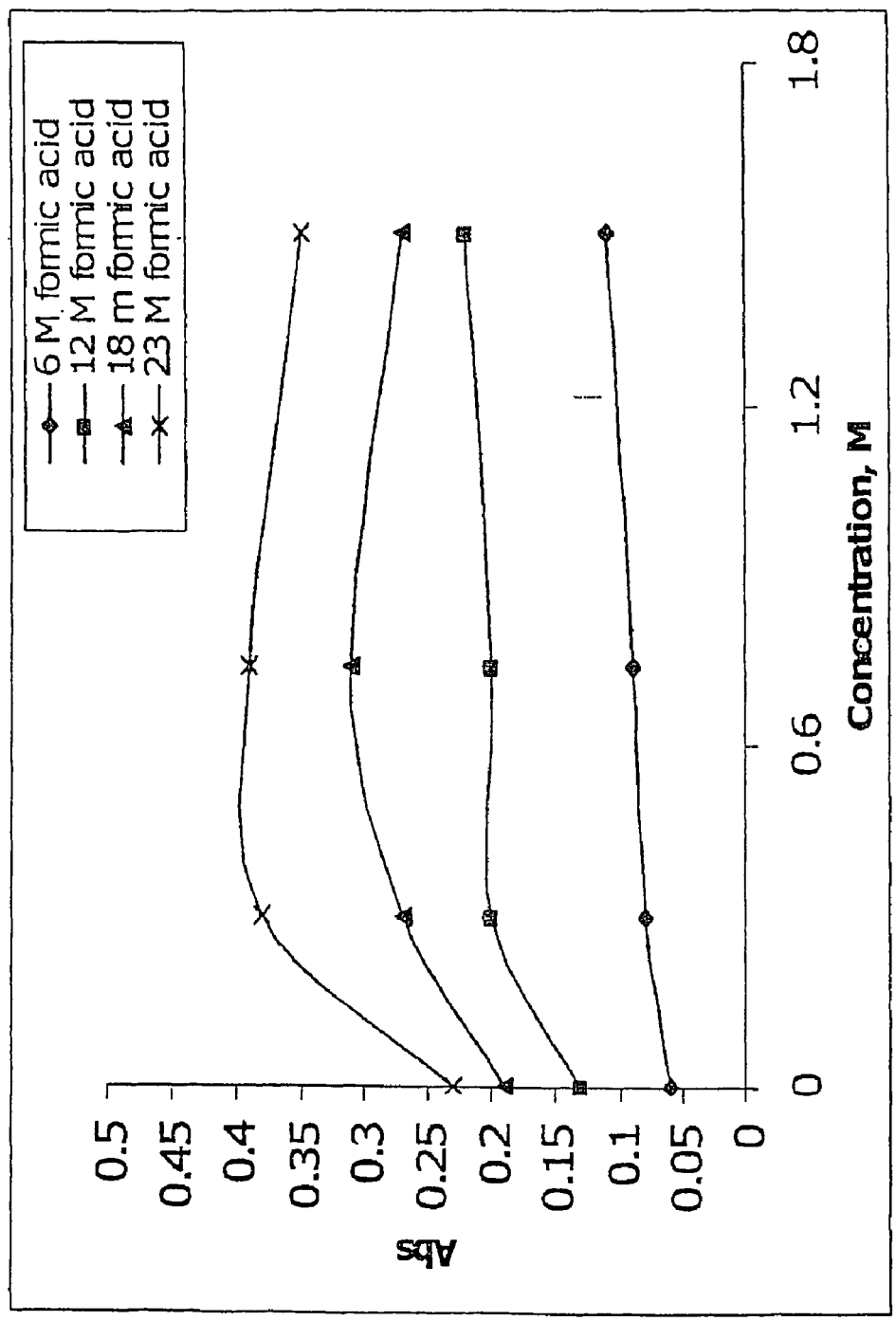
FIG. 6. Effects on the concentration of formate ions on the ICP-OES response arising from the continuous photochemical treatment of a solutions containing 20 mg/liter Ni(II).
Figure 7:
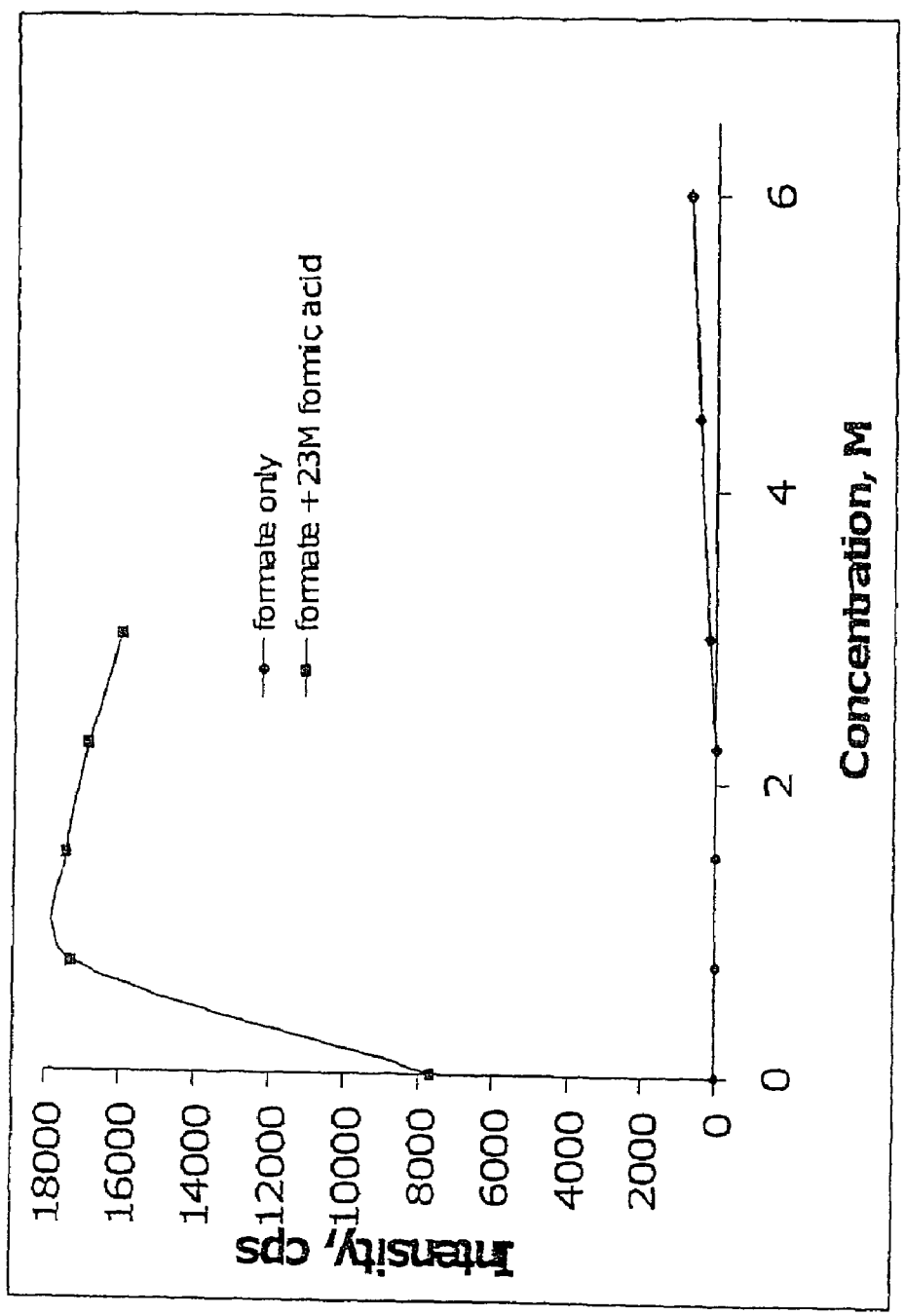
FIG. 7. Effect of concentration of formate ion on ICP-OES response arising from the continuous photochemical irradiation of solutions containing 10 mg $l^{-1}$ Ni(II).

Volatile nickel species were rapidly formed in the photoreactor, giving rise to relatively sharp atomic absorption signals in a matter of only a few minutes. Formic acid was initially investigated for its effects on the generation of volatile nickel species, as it has the simplest structure among the organic acids studied. Short irradiation times (4 min) in the presence of formic acid resulted in the AAS detection of signals whose intensities were strongly dependent on the acidity of the reaction medium, as shown by the data in FIG. 6. No plateau in the range of 2~23.0 M HCOOH is evident, suggesting that the optimum acidity range lies at yet higher concentrations of formic acid if these could be accessed. This is evident from the two-fold increase in response obtained by the addition of formate ion to the concentrated formic acid (23 M). Enhanced detection power was achieved with use of ICP-OES. Results are presented in FIG. 7. Additional studies revealed that the plateau for optimum acidity and formate ion concentration can be obtained in the presence of 23 M formic acid together with 1~3.0 M HCOONa. It is noteworthy that volatile nickel species are also generated from solutions containing formate anions alone; however, the generation efficiency appears to be significantly lower when compared with that in the formic acid system (cf FIG. 7). Efforts aimed at decreasing the concentration of formic acid based on the addition of formate anion appear not to be successful, suggesting that use of formic acid concentrations as high as possible (i.e., 23 M), are necessary. This can be clearly seen from the data in FIG. 6. In order to further distinguish the role played by formate anion (HCOO—) in enhancing signal intensity, as opposed to a simple increase in solution pH, a series of acetate ($CH_3COONa$) or NaOH solutions were substituted for HCOO—. Both acetate and NaOH, when added to the 23 M formic acid, resulted in the same intensity enhancement effects on the nickel signal as those produced by the sodium formate. Clearly, this positive effect does not simply arise from the increased formate anion concentration, considering that the addition of less than 3 M formate to the 23 M formic acid solution only slightly changes the pH. It might thus be speculated that production of the volatile nickel species is favored by a buffered system in which the pH is stable before and after the photochemical reaction. In this work, 23 M formic acid plus 0.5 M sodium formate was selected as the optimum reaction medium along with an irradiation time of 4 min.

Apart from formic acid, acetic acid can also be used to generate volatile nickel compounds under UV irradiation. With increasing concentration of acetate anion, the Ni signal intensity increases. Furthermore, enhancement effects earlier noted following the addition of sodium, or sodium acetate, or OH— anions no longer occur.

A different situation was obtained when propionic acid was used in the reaction medium, as a sharp peak in optimum response arises with increasing acid concentration. Volatile nickel species become more difficult to generate when the acid concentration is higher than 10 M. Although the mechanism of action is unclear, an insufficient irradiation time (4 min only) appears to be partially responsible for this decrease, and this point will be discussed later. It is expected that the optimum concentration of propionic acid may be shifted to higher values (up to 8 M) by utilizing an increased irradiation time.

Standards prepared from different anions of nickel, i.e., $NiCl_2$, $NiSO_4$, and $Ni(NO_3)_2$, were tested in the presence of the various LWM acids; no difference in intensity of the nickel signal was evident.

Irradiation Time

Figure 8:
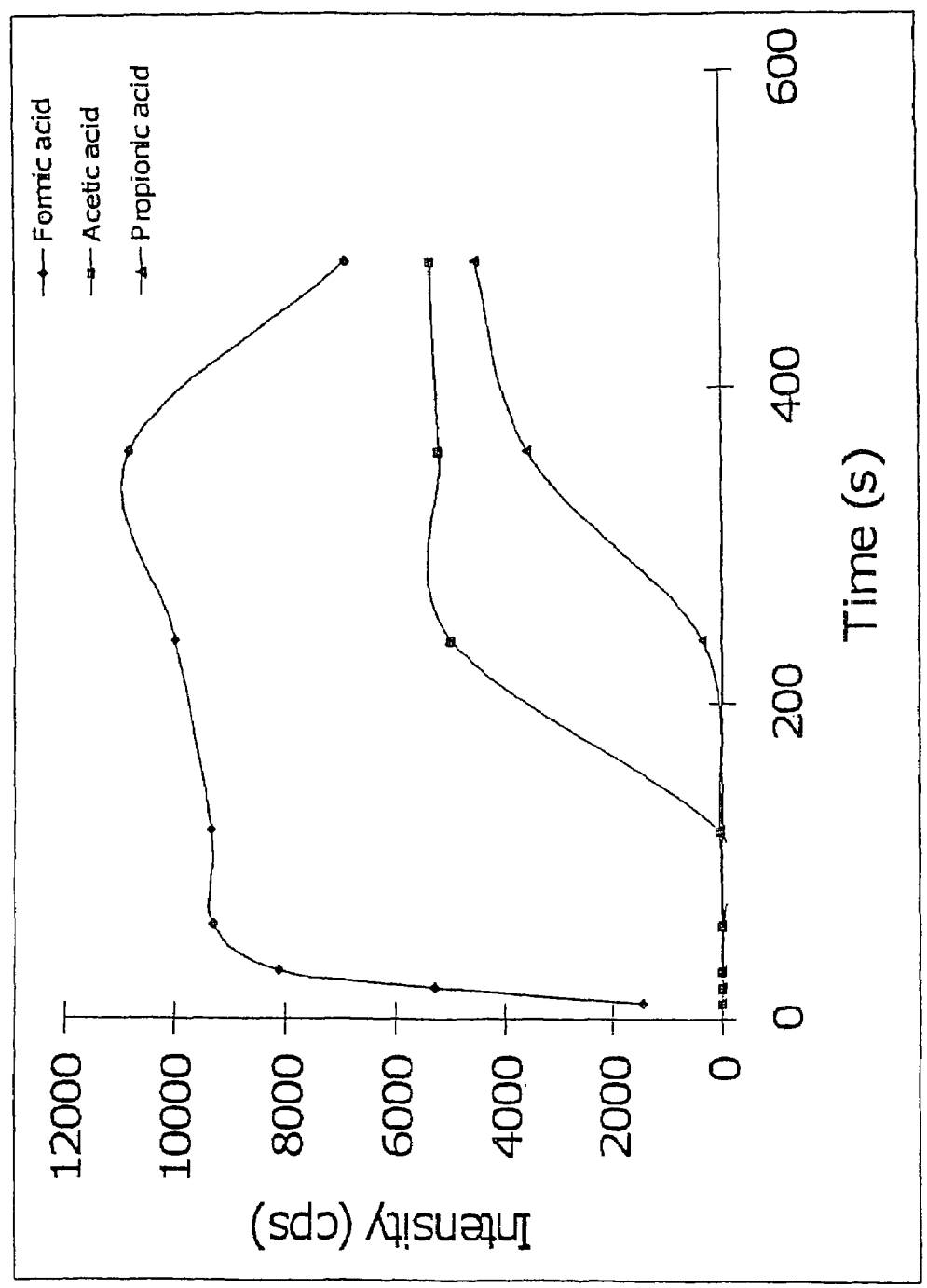
FIG. 8. Effect of irradiation time on the F-AAS signals arising from the continuous photochemical irradiation of solutions containing 5 mg $l^{-1}$ Ni(II) in the presence of 23 M formic acid +0.5 M sodium formate, 6.3M of acetic acid, and 12 M propionic acid, respectively.

By fixing the sample flow rate and changing the length of the PTFE tube wrapped around the UV lamp, the effect of residence time (irradiation time) of the analyte in the irradiation field could be investigated. For this purpose, a solution containing 5 mg/liter of Ni(II) and 23 M of formic acid +0.5 M of sodium formate, or 6.3 M of acetic acid, or 12 M propionic acid was used. The results are shown in FIG. 8, wherein it is evident that the optimum irradiation time is different for each of the acids. Acids having longer carbon chains require longer irradiation times. For example, when formic acid is used, the optimum irradiation time ranges from 50 s to 6 min, whereas at least 4 min is needed when using acetic acid, and more than 8 min, (likely still insufficient) is needed for propionic acid. Surprisingly, after only a 10 second irradiation, a relatively larger amount of volatile nickel species could be produced in the formic acid system. In order to avoid possible losses of volatile analyte species induced by any competitive photochemical (decomposition) reactions when longer irradiation times were attempted, a 6 m length of PTFE tubing ensured that the sample solution received a 4 min irradiation and was thus selected for further work.

Stability of Resultant Compounds

The effect of the length of the tygon transfer line placed between the gas-liquid separator and the F-AAS nebulizer on the signal intensity from a 5 mg/liter solution of Ni(II) was examined. No significant decrease in intensity was observed as the transport distance was increased (even up to 10 m), suggesting that, once formed and removed from the reactor, the volatile species is very stable and does not suffer detectable losses during the transport process. This conclusion is also supported by experiments wherein the volatile product was bubbled through solutions of 4 M HCl or NaOH, or when the transfer tube was immersed into an ice-salt trap (−2° C.), or hot water bath (40° C.). In all situations, no signal attenuation occurred.

Generation Efficiency

The overall generation efficiency is defined as the convolution of the efficiency of species formation with those of its gas/liquid separation and transport to the detector. The overall efficiency was estimated from a comparison of the resulting F-AAS measurements made on solutions aspirated into the spectrometer before and after their irradiation. The results are presented in Table 2. Over the full range of nickel concentrations tested, more than 90% efficiency could be achieved. In order to deconvolute the efficiency components for gas/liquid separation and transport from that of photochemical generation, an irradiated 50 mg/liter of Ni sample solution was reprocessed through the reactor, once without additional irradiation (i.e., with the UV lamp off) and a second time with the lamp on. Without a second UV irradiation, approximately 2% of the total nickel was subsequently recovered by simple passage through the gas/liquid separation system, whereas about 7% of the Ni was detected as a volatile species following a second UV irradiation. It may be concluded that at least 2% of the volatile product remains in solution due to its solubility or because of inefficient phase separation, suggesting that the real photochemical generation or conversion efficiency is in excess of 95% in the formic acid system. However, the efficiency of photochemical carbonylation was found to be concentration dependent, in that when higher concentrations of nickel, i.e., 500 mg/liter were used, the generation efficiency appeared to decrease to less than 60%. No volatile product could be detected at concentrations above 1000 mg/liter instead, a grey-black precipitate (probably finely divided active $Ni^0$) was produced.

TABLE 2

Nickel tetracarbonyl generation efficiency.

| Before UV irradiation | | After UV irradiation | | Generation efficiency, |
|---|---|---|---|---|
| Ni added (mg L$^{-1}$) | Absorbance | Ni found, mg L$^{-1}$ | Absorbance | %* |
| 1.0 | 0.0545 ± 0.0011 | 0.10 ± 0.002 | 0.0045 ± 0.0005 | 90 ± 2.0 |
| 5.0 | 0.1856 ± 0.0029 | 0.28 ± 0.005 | 0.0128 ± 0.0005 | 94 ± 1.6 |
| 10.0 | 0.3621 ± 0.0058 | 0.49 ± 0.008 | 0.0217 ± 0.0005 | 95 ± 1.6 |
| 50.0 | 0.8467 ± 0.0146 | 3.60 ± 0.065 | 0.1339 ± 0.0023 | 93 ± 1.8 |

*Estimated from solutions of 23 M formic acid plus 0.5 M sodium formate following UV irradiation (n = 5).

Species Identification

Figure 9A:
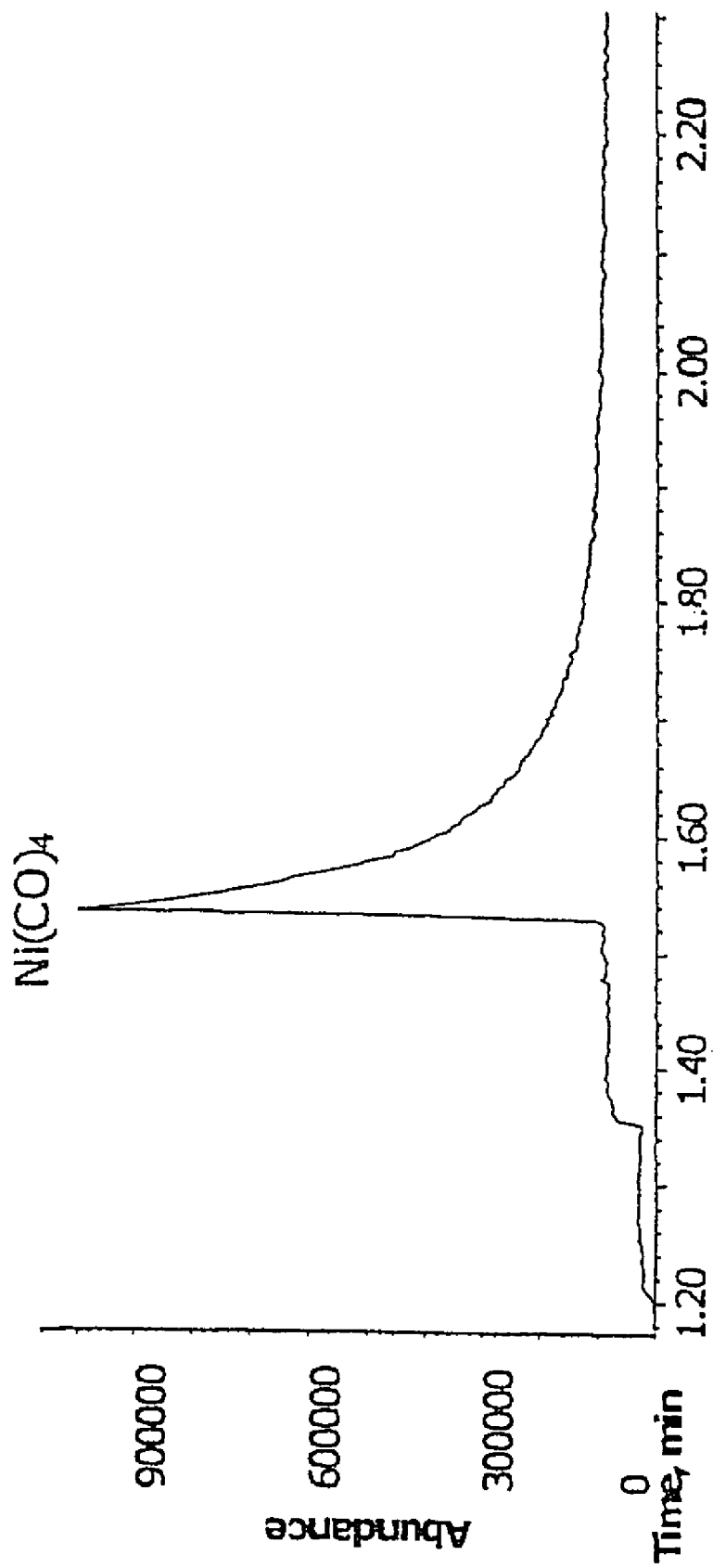
FIGS. 9a and b Electron impact mass spectra arising from GC sampling of cryogenically trapped volatile Ni compounds produced by UV irradiation of solutions containing.
Figure 9B:
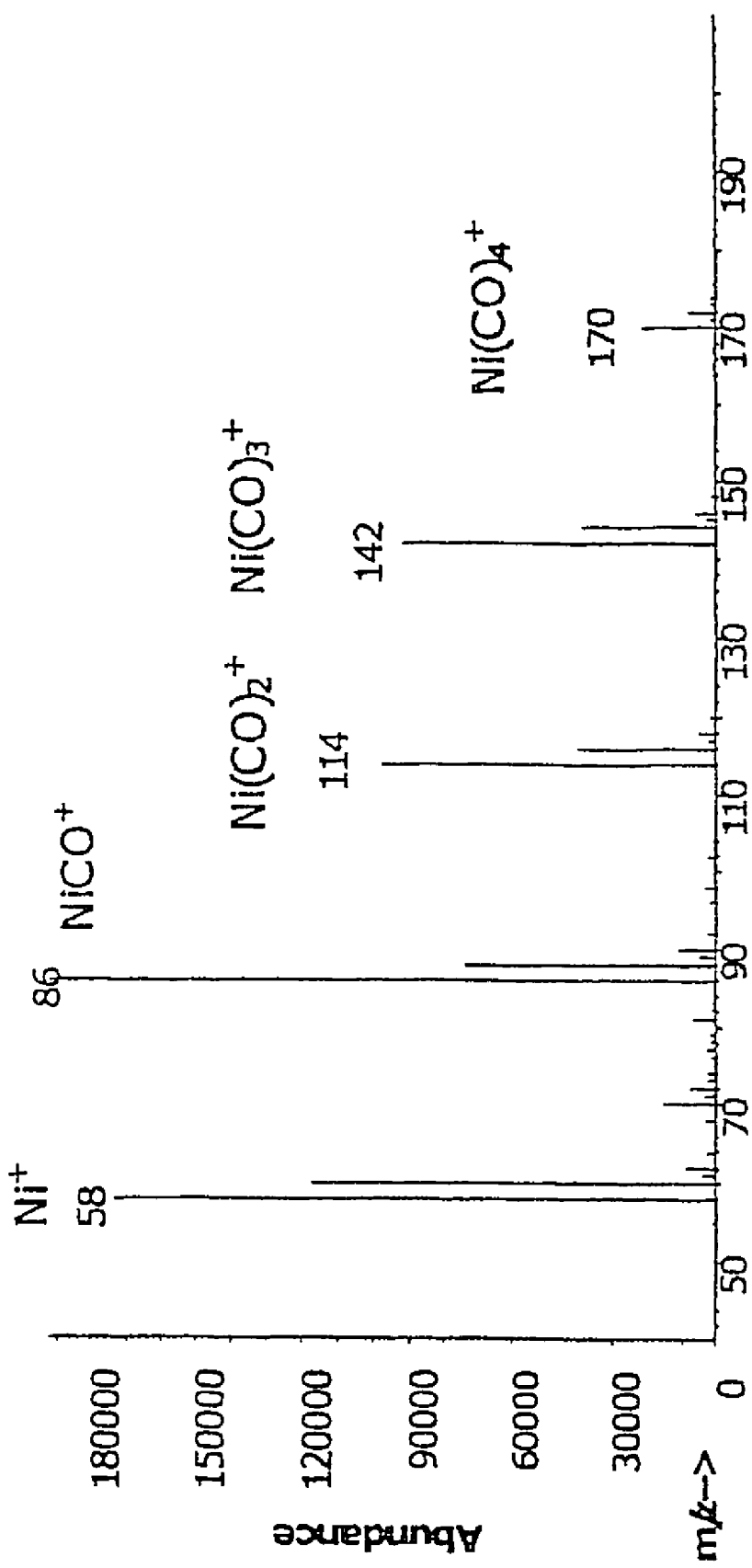
FIG. 9b presents the mass spectrum taken at a retention time of 1.6 s obtained using 10 mg l-1 Ni(II), 23 M HCOOH and 0.5 M HCOONa.
Figure 10:
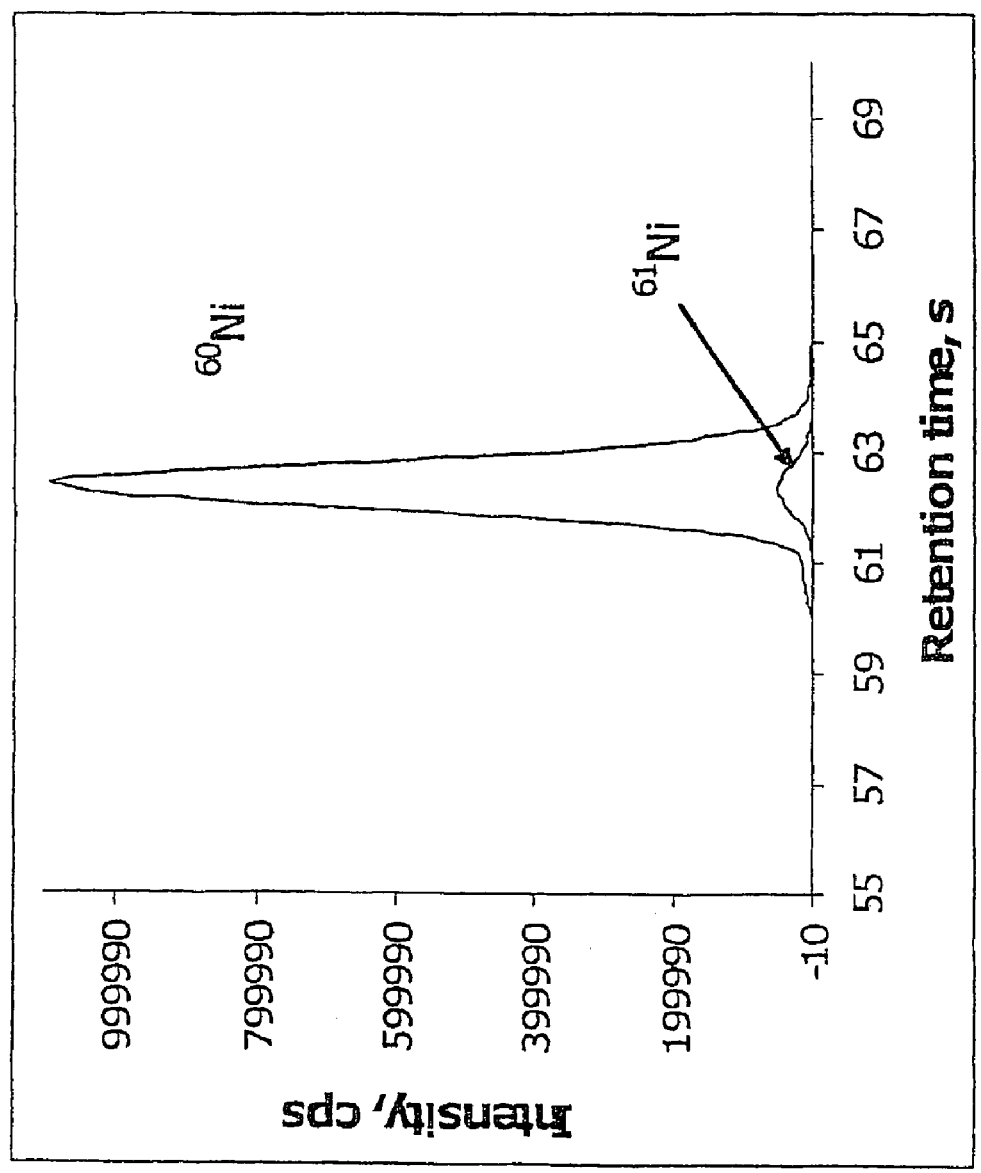
FIG. 10. ICP-MS response from GC introduction of cryogenically trapped volatile Ni compounds produced by UV irradiation of solutions containing 10 mg $l^{-1}$ Ni(II), 13 M $CH_3CH_2COOH$.
Figure 11A:
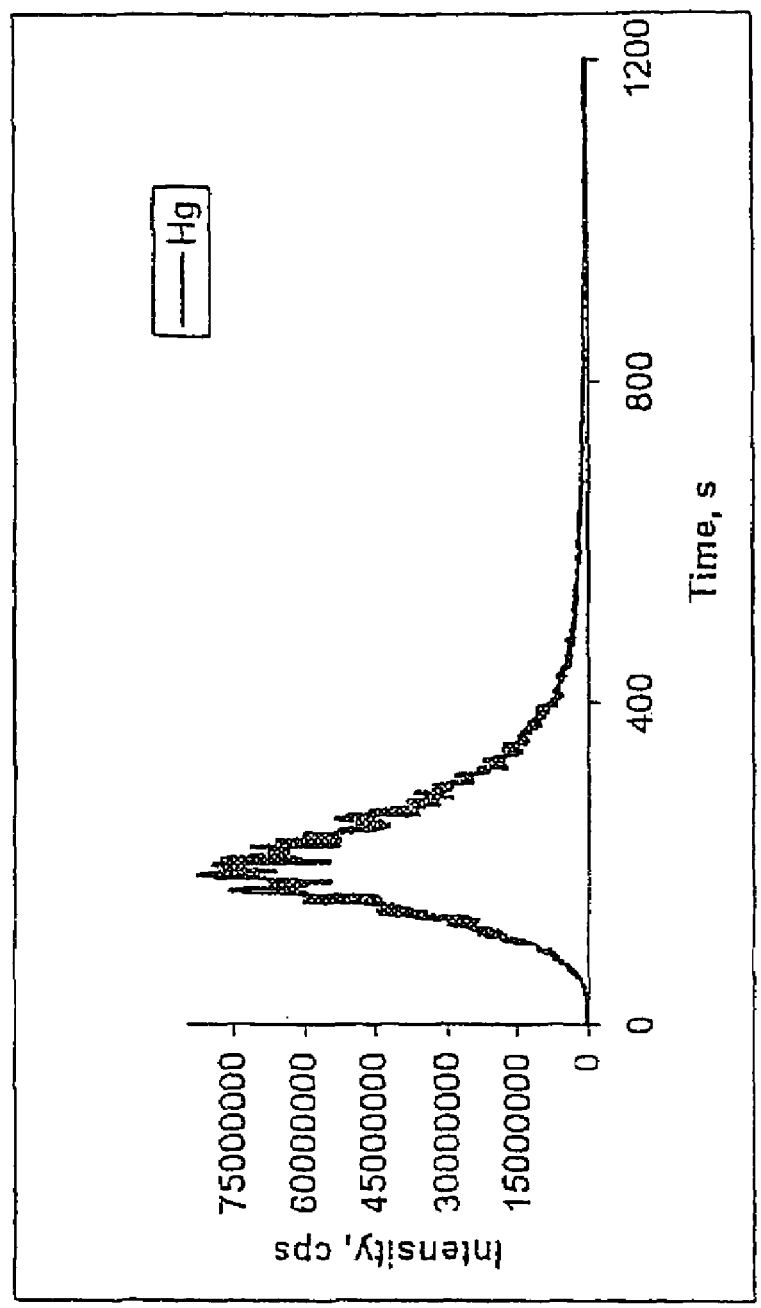
FIGS. 11a-11e ICP-MS responses arising from the continuous photochemical irradiation of solutions containing acetic acid and 0.1 mg/liter of ions of
  11a) Hg;
  11b) I;
  11c) Te, Sb and As;
  11d) Pb, Sn and Rh; and
  11e) Cd.
Figure 11B:
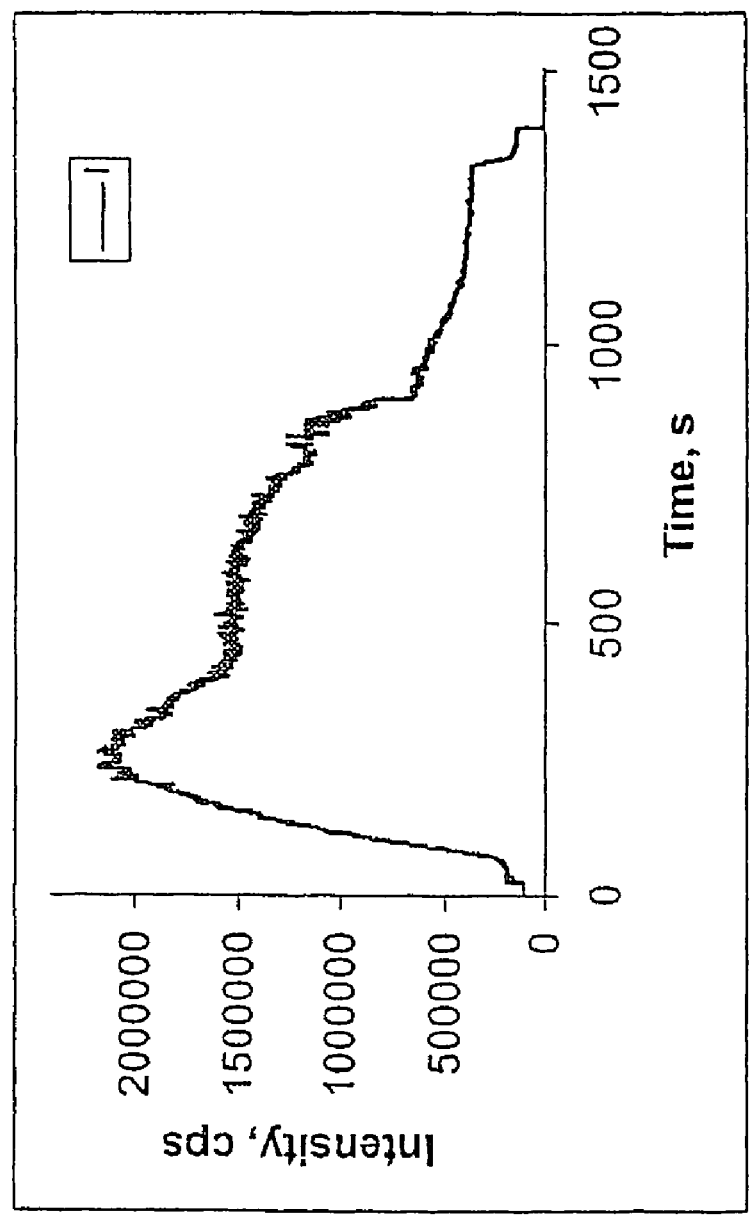
Figure 11C:
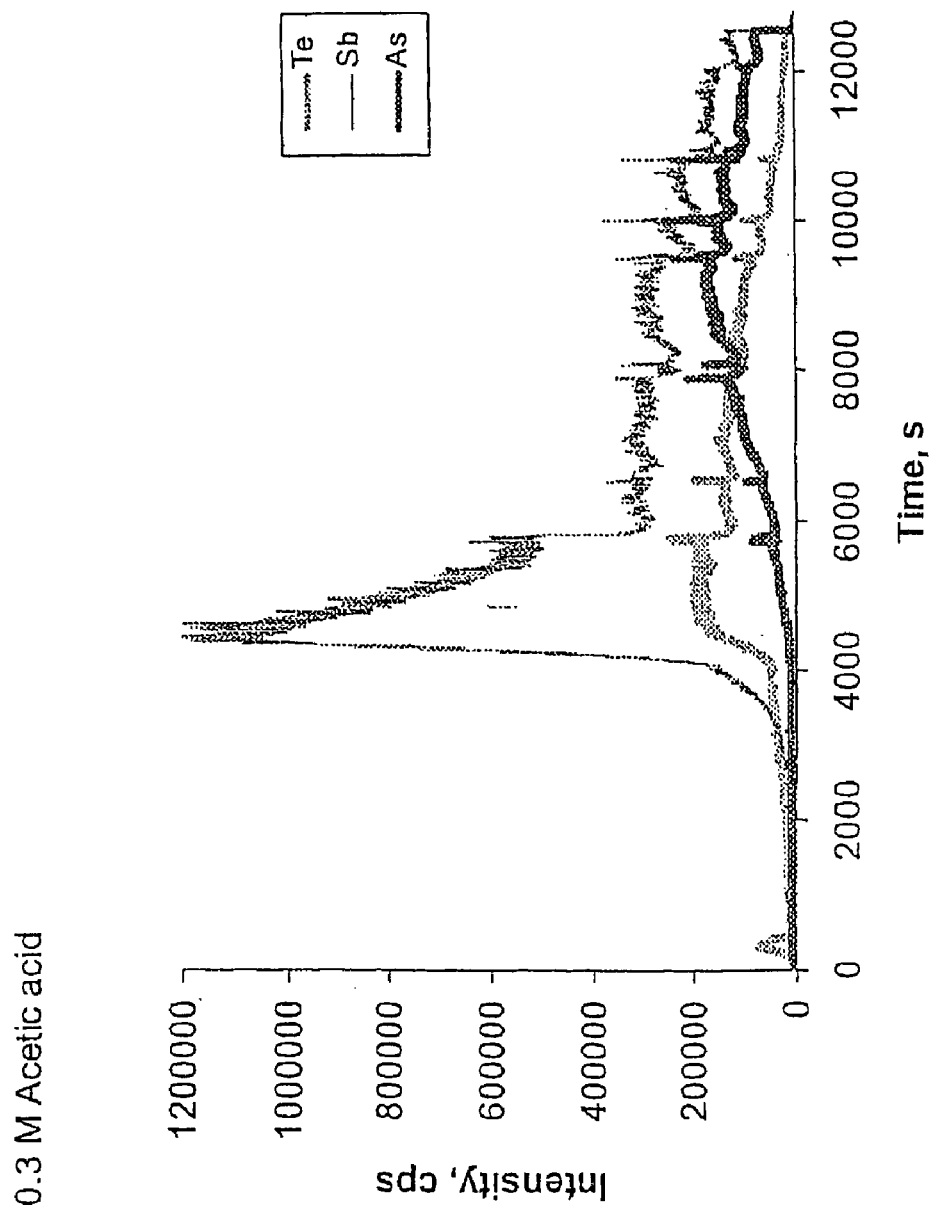
Figure 11D:
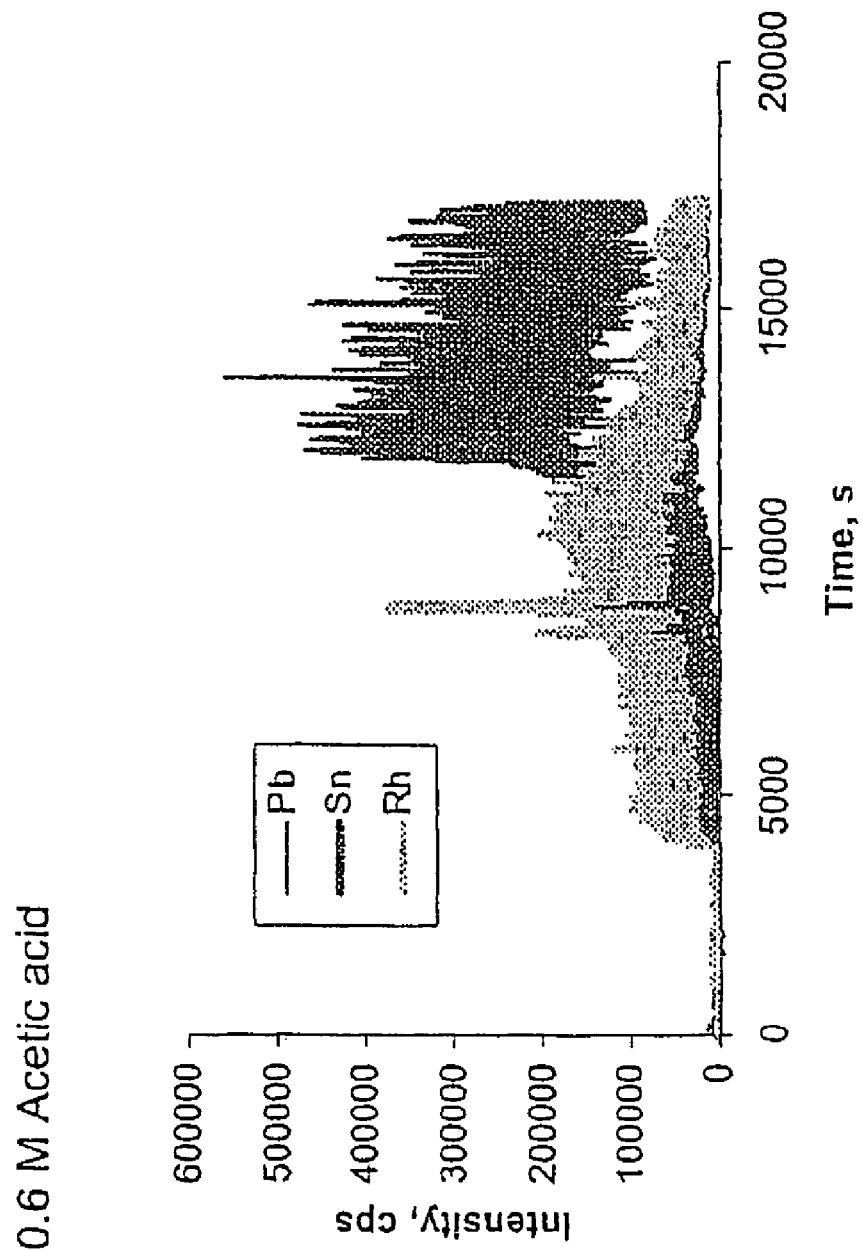
Figure 11E:
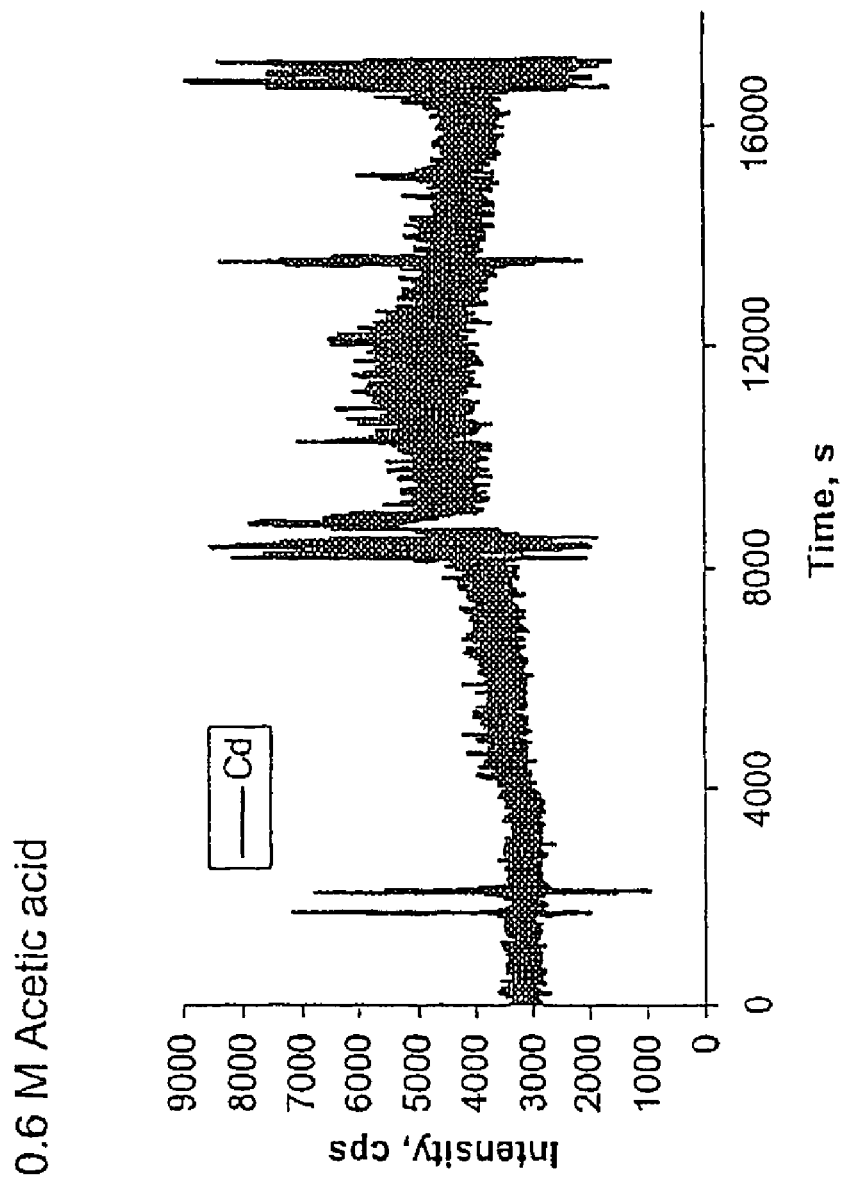

The tetracarbonyl is the only common volatile species of nickel and its GC, characteristics have been reported in an early study by Sunderman et al. [113] (electron capture detection using a 20 m Carbowax column) and electron impact mass spectra have also been documented. [114-115] The volatile compounds formed in this study are inert to reaction in acidic and alkaline solutions, and stable at room temperature. These species can be easily trapped at low temperatures (partially using a dry ice-acetone bath at −78° C. and completely in a liquid nitrogen trap at −196° C.) and released on raising the temperature. This has permitted identification of their structures using GC-MS. The volatile species produced by subjecting a 1 liter volume of sample containing 10 mg/liter Ni(II), 23 M HCOOH and 0.5 M HCOONa to UV irradiation were cryogenically trapped, as described earlier. Results from subsequent GC-MS measurements on this trapped product are shown in FIG. 9a. Fragments containing Ni are easily recognized in the mass spectra as a result of their characteristic isotopic pattern [$^{58}$Ni (68.07%), $^{60}$Ni (26.22%), $^{61}$Ni (1.13%), $^{62}$Ni (3.63%), and $^{64}$Ni (0.925%)] arising from the five natural nickel isotopes present in the chromatographic peak (see FIG. 9b). This isotopic pattern was evident in fragments for Ni+ at m/z 58, NiCO+ at m/z 86, Ni(CO)$_2$+ at m/z 114, Ni(CO)$_3$+ at m/z 142, and Ni(CO)$_4$+ at m/z 170. No other chromatographic peaks indicative of the presence of additional species were detected. The resulting fragmentation patterns are in fair agreement with the reported mass spectrum of Ni(CO)$_4$, [114-115] which arises from stepwise loss of CO as the predominant fragmentation route. It may be concluded that the volatile nickel containing species produced by UV photolysis of nickel chloride in formic acid solutions is Ni(CO)$_4$. Identical results (a retention time of 1 min for the chromatographic peak and for the typical Ni(CO)$_4$ mass spectral patterns) were also obtained following irradiation of solutions containing 10 mg L-1 Ni(II) and 6.3 M CH$_3$COOH or 12 M CH$_3$CH$_2$COOH. The same results are obtained, but the relative ion intensities are comparatively lower than those obtained following irradiation of a solution containing formic acid and formate anions. This is likely due to the low generation efficiency in the former solutions. Introduction of a sub-sample of the collected gas phase formed by treatment of propionic acid solutions into the GC-ICP-MS resulted in the detection of only one nickel-containing peak, which can be seen in FIG. 10, confirming the GC/MS results that only a single nickel species is produced.

Proposed Mechanism

As discussed previously [111], aliphatic organic acids may follow either of two different pathways during their anaerobic photolytic decomposition, which usually produces hydrocarbons, CO$_2$, and small amounts of CO and H$_2$ i.e.:

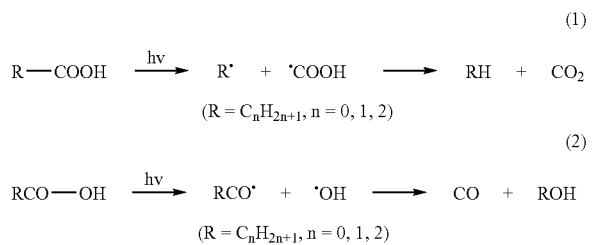

The resultant hydrogen and carboxyl radicals, which probably play a role in the reduction of Ni$^{2+}$ to Ni$^0$, subsequently react with the CO produced in reaction (2), resulting in the production of Ni(CO)$_4$:

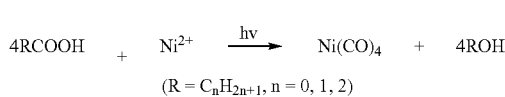

In general, reaction 1 occurs more frequently than reaction 2. In the case of formic acid, reaction 1 occurs six-fold more frequently than reaction 2 [116-117]. In our previous study of the UV-induced alkylation of inorganic selenium, we speculated that reaction 2 becomes less favorable with increasing carbon chain length because when n equals 1 or 2 (acetic and propionic acids), formation of selenium carbonyl was undetectable. This no longer appears to be the case for nickel as this metal may play a role in "catalyzing" reaction (2), favoring the desired direction in which the carbon monoxide produced is rapidly removed from system by combing with reduced nickel. This may accelerate the speed of reaction (2), despite use of acetic or propionic acids. However, in consideration of the longer irradiation time required with the acetic or propionic acid systems, it is possible that another pathway exists for the formation of nickel tetracarbonyl. Possibly, the organic acids are decomposed into formic acid by a photochemical process in the first step and then carbonylation of nickel may occur according to reaction (3). This may be the reason why a longer irradiation time is required compared with that for the formic acid. The details of the mechanism are not completely understood and must still be clarified.

C. Other Noble and Transition Metals

Initial experiments were undertaken using a solid phase microextraction fiber (SPME) inserted into the headspace of a silicone septum-sealed vial into which a 4 W low-pressure penlight mercury lamp had been mounted (sheathed in a closed quartz finger). The vial was spiked with a solution of approximately 10 ml DIW containing 0.7 M formic acid to which 10 mg of TiO$_2$ was added, in accordance with the protocol described by Kikuchi and Sakamoto [8]. A multi-element spike was then added at a nominal concentration of 0.5 mg/L. Following exposure of the batch sample to the UV source, the volatile contents of the headspace were sampled with the SPME fiber and subsequently desorbed into the ICP-TOF-MS using the heated desorption cell directly connected to the base of the torch. Full spectrum scans acquired during the desorption transient revealed the presence of volatile species of As, Hg, Sb, Sn, Se, Pb.

For some elements, our preliminary experiments revealed that the presence of TiO$_2$ is not always necessary. Using a continuous 'flow through' UV photo reactor, volatile species of arsenic, selenium, tin, antimony, mercury, lead, iodine, tellurium, nickel, cobalt, sulfur and iron and several other elements, have been detected. FIGS. 11a-11e show the ICP-MS responses arising from the continuous photochemical irradiation of solutions containing CH$_3$CH$_2$COOH and 0.1 mg l$^{-1}$ of a) Hg, b) I, c) Te, Sb and As, d) Pb, Sn and Rh, and e) Cd.

The UV generation efficiency was found to be dependent on the acidity under which the reaction is performed.

Photochemical vapour generation may present the ultimate solution to environmental remediation problems relating to water purification and environmental cleanup. According to results presented in this study, specific organometallic compounds could be synthesized by selecting the appropriate LMW acid as a reagent. Industrial wastewater could then be economically treated by UV irradiation. The volatile products so produced could be easily collected and subjected to recycling rather than directly released into the atmosphere. The entire process could be accomplished under controlled conditions. Following UV irradiation and "disinfection", the effluent could be disposed of with low risk to the environment. A similar approach could be used to remediate contaminated soil or landfill, wherein the soil could be dosed with LMW (acetic acid) periodically, or advantage taken of natural levels of LMW acids. Exposure to UV flux would then serve to transform/transfer the offending target elements into the atmosphere for disposal or collection.

This process may also offer a new pathway for the production/synthesis of high purity materials and also for highly pure metal refining. Additionally, UV photolysis of such solutions may offer a new vapor generation/alkylation method for application in analytical chemistry and also in the semiconductor/life science industry (metallorganic chemical vapour deposition, MOCVD). The production of gaseous metallic compounds by UV also enables the production of fine powders and various nano particles.

Conclusions

The subject invention demonstrates that inorganic selenium can be readily transformed e.g. alkylated by the action of UV light, thereby providing a novel means of synthesizing biologically important organoselenium compounds [101]. It will be appreciated by the skilled in the art that a large number and variety of radicals and other intermediate species arising from UV photodissociation in converting inorganic selenium into compounds such as SeCO, DMSe and DESe can be synthesized. Utilizing such short-lived radicals and intermediate species, or even a product such as SeCO, to control the photochemical direction of the reaction, the production of numerous new organometallic compounds is possible.

Photochemistry according to the subject invention provides new pathways for the synthesis of organometallic compounds including the generation of $Ni(CO)_4$ from aqueous solutions of its inorganic salts using a direct photochemical technique, thereby offering an efficient route to its synthesis via green chemistry. In a similar manner, decomposition of $Ni(CO)_4$ to yield nickel may be economically useful in materials chemistry for production of high purity nickel powder or nanoparticles.

The subject invention may be applied to extractive nickel metallurgy to produce pure nickel directly from solutions of acid leachates of its sulfide or oxide ores in the presence of LMW acids following UV irradiation.

Nickel tetracarbonyl is extremely poisonous (threshold limit is set at 0.001 ppm, compared to 10 ppm for hydrogen cyanide and 100 ppm carbon monoxide) [118]. Its carbonylation may occur in some nickel-contaminated foods, once LWM organic acids and UV light are abundantly available, as is the case when UV disinfection processes are employed to destroy yeasts, moulds, bacteria, viruses and algae in the manufacturer of foods, pharmaceuticals and beverages in an environment where foods float in water past UV lamps for at least 15 to 20 minutes exposure [119]. A further concern is the disposal of nickel-containing materials to landfill. Formation of volatile nickel species, as well as molybdenum and tungsten carbonyls, has been reported in several previous investigations of municipal waste deposits [120-123]. As LMW acids are probably the end products of the degradation of the majority of organic compounds in nature, before being finally mineralized to $CO_2$, and $H_2O$, they are likely enriched in landfill sites or aquatic and terrestrial ecosystems. Exposure to ultraviolet radiation may result in the generation of toxic nickel carbonyl throughout the ecosystem.

These studies have demonstrated that various elements in solution can be readily transformed e.g. alkylated by the action of UV light, thereby providing a novel means of synthesizing biologically/industrially/environmentally important compounds. It will be appreciated by those skilled in the art that a large number and variety of radicals and other intermediate species arising from UV photodissociation may be employed in converting elements in such solutions to organometallic products. It is also contemplated that other elements not specifically mentioned herein are amenable to vapor generation by this route, as noted earlier.

According to the invention, it has been shown that photochemical irradiation of aqueous solutions containing an organic acid and ions of metals or other elements such as iodine, phosphorus and sulphur will result in the chemical transformation and/or reduction of the ions. The invention may be worked with noble and transition metals. The method may be effectively worked with ions of metals selected from the group consisting of As, Bi, Cu, Au, Pt, Pd, Hg, Sb, Sn, Te, Co, Fe, Cd, Rh, Ag, Se, Pb and Ni. The invention may also be used to transform ions of other elements including I, S and P. Photochemical transformations effected by the invention include reduction of ions, synthesis of metal-carbon bonds, alkylation of metal ions, synthesis of metal-carbonyl bonds, and synthesis of metal hydrides. The reduction, alkylation and carbonylation of the metals ions produces volatile species which enables the removal of the metals from the aqueous environment. Accordingly, the invention also enables the preparation of fine powders and nano particles of the extracted metals. The reduction, alkylation and carbonylation of the metals ions produces volatile species which enables the removal of the metals from the aqueous environment.

Similarly, photochemical transformations of the ions of elements such as halogens, P and S may be effected by the invention. Such transformations include reduction of ions, synthesis of element-carbon bonds, alkylation of elemental ions, synthesis of element-carbonyl bonds, and synthesis of elemental hydrides. The reduction, alkylation and carbonylation of the elemental ions produces volatile species which enables the removal of the elements from the aqueous environment.

REFERENCES

1. Challenger F., Biological methylation. Advan. In Enzymol., 1951:12:429-491.
2. B. A. Richardson, Sudden infant death syndrome: a possible primary cause, J. Forens. Sci. Soc., 1994, 34, 199-204.
3. B. A. Richardson, Cot mattresses and sudden infant death syndrome, Lancet 1995, 345, 1045.
4. Ardon, M., Woolmingtoh, K. and Pernick, A., Methylpentaaquochromium(III) ion, Inorg. Chem. 1971, 10, 2812.
5. H. Akagi, Y. Fujita, and E. Takabatake, Photochemical transformation of mercuric sulfide into methylmercury in aqueous solutions, Chem. Lett., 1976, 1-4.
6. L. Landner, Biochemical model for the biological methylation of mercury suggested from methylation studies in vivo with *Neurospora crassa*, Nature, 1971, 230, 452-454.
7. Van Fleet-Stalder and Chasteen, Using fluorine-induced chemiluminescence to detect organo-metalloids in the headspace of phototrophic bacterial cultures amended with selenium and tellurium, J. Photochem. Photobiol. B, 1998, 43, 193-203.
8. E. Kikuchi and H. Sakamoto, Kinetics of the reduction reaction of selenate ions by TiO2 photocatalsst, J. Electrochem. Soc. 2000, 147, 4589-4593.
9. D. Amouroux, C. Pécheyran and O. F. X. Donard, Formation of volatile selenium species in synthetic seawater under light and dark experimental conditions, Appl. Organometal. Chem., 2000, 14, 236-244.
10. L. Yang, Z. Mester and R. E. Sturgeon, Improvement in measurement precision with SPME by use of isotope dilution mass spectrometry and its application to the determination of tributyltin in sediment using SPME GC-ICP-MS, J. Anal. At. Spectrom., 2002, 17, in print.
11. Z. Mester, R. E. Sturgeon, J. W. Lam, P. S. Maxwell and L. Peter, Speciation without chromatography. Part I. Determination of tributyltin in aqueous samples by chloride generation, headspace solid-phase microextraction and inductively coupled plasma time of flight mass spectrometry, J. Anal. At. Spectrom., 2001, 16, 1313-1316.

12. B. Gosio, Arch. Ital. Biol., 1901, 35, 201.
13. Challenger F, Higginbottom C and Ellis L., The formation of organo-metalloidal compounds by micro-organisms. Part I. Trimethylarsine and dimethylethyarsine, J. Chem. Soc., 1933, 95-101.
14. T. G. Chasteen, M. Wiggli, and R. Bentley, Historical Review. Of garlic, mice and Gmelin: the odor of trimethylarsine, Appl. Organometal. Chem., 2002, 16, 281-286.
15. F. Challenger, H. E. North, The production of organo-metalloidal compounds by microorganisms. II. Dimethyl Selenide, J. Chem. Soc. 1934, 68-71.
16. Challenger F., Biological methylation. Advan. In Enzymol., 1951:12:429-491.
17. B. A. Richardson, Sudden infant death syndrome: a possible primary cause, J. Forens. Sci. Soc., 1994, 34, 199-204.
18. B. A. Richardson, Cot mattresses and sudden infant death syndrome, Lancet 1995, 345, 1045.
19. Brown K M, Arthur J R. Selenium, selenoproteins and human health: a review. Public Health Nutr. 2001, 4(2B), 593-9.
20. Rayman M P. The importance of selenium to human health. Lancet. 2000, 356 (9225), 233-241.
21. Beck M A. Antioxidants and viral infections: host immune response and viral pathogenicity. J Am Coll Nutr. 2001, 20(5 Suppl), 384S-388S.
22. Schrauzer G N, Sacher J. Selenium in the maintenance and therapy of HIV-infected patients. Chem Biol Interact. 1994, 91(2-3), 199-205.
23. Dworkin B M. Selenium deficiency in HIV infection and the acquired immunodeficiency syndrome (AIDS). Chem Biol Interact. 1994, 91(2-3), 181-186.
24. Aaseth J, Haugen M, Forre O. Rheumatoid arthritis and metal compounds-perspectives on the role of oxygen radical detoxification. Analyst. 1998, 123(1), 3-6.
25. Aaseth J, Alexander J, Thomassen Y, Blomhoff J P, Skrede S. Serum selenium levels in liver diseases. Clin Biochem. 1982, 15(6), 281-283.
26. Frost, D. V., The two faces of selenium—Can selenophobia be cured?, CRC Crit. Rev. Toxicol., 1972, 1, 467-514.
27. Clark L C, Dalkin B, Krongrad A, Combs G F Jr, Turnbull B W, et al. Decreased incidence of prostate cancer with selenium supplementation: results of a double-blind cancer prevention trial. Br J Urol. 1998, 81(5), 730-734.
28. Tarp U. Selenium and the selenium-dependent glutathione peroxidase in rheumatoid arthritis. Dan Med Bull. 1994, 41(3), 264-274.
29. Biswas S, Talukder G, Sharma A. Comparison of clastogenic effects of inorganic selenium salts in mice in vivo as related to concentrations and duration of exposure. Biometals. 1999, 12(4), 361-368.
30. Biswas S, Talukder G, Sharma A. Chromosome damage induced by selenium salts in human peripheral lymphocytes. Toxicol In Vitro. 2000, 14(5), 405-408.
31. Franke, K. W., and A. L. Moxon. The minimum fatal doses of selenium, tellurium, arsenic and vanadium. J. Pharmacol. Exp. Ther., 1936, 58, 454-459.
32. K. P. McConnell and O. W. Portman, Toxicity of dimethyl selenide in the rat and mouse. Proc Soc Exp Biol Med 1952, 79, 230-231.
33. Levine, V. E., The reducing properties of microorganisms with special reference to selenium compounds, J. Bacteriol., 1925, 10, 217-263,
34. Ganther H E, Kraus R J. Chemical stability of selenious acid in total parenteral nutrition solutions containing ascorbic acid. JPEN J Parenter Enteral Nutr. 1989, 13(2), 185-188.
35. S. C. B. Myneni, T. K. Tokunaga, G. E. Brown Jr, Abiotic Selenium Redox Transformations in the Presence of Fe(II, III) Oxides, Science, 1997, 278, 1106-1109,
36. Doran J. W., and Alexander M., Microbial Formation of Volatile Selenium Compounds in Soil, Soil Sci. Soc. Am. J., 1977, 41, 70-73.
37. Chau, Y. K., Wong, P. T. S., Silverberg, B. A., Luxon, P. L., and bengert, G. A., Methylation of Selenium in the Aquatic Environment, Science, 1976, 192, 1130-1131.
38. Reamer D. C., and W. H. Zoller. Selenium biomethylation products from soil and sewage sludge. Science 1980, 208, 500-502.
39. J. W. Doran, Microorganisms and the Biological Cycling of Selenium. In: Advances in Microbial Ecology, Vol. 6, K. C. Marshall, Edition, Plenum Press, 1982, pp 1-32.
40. W. T. Frankenberger, Jr., U. Karlson, Dissipation of Soil Selenium by Microbial Volatilization, In Biogeochemistry of trace metals/edited by Domy C. Adriano., Boca Raton: Lewis Publishers, 1990.
41. M. Knott, Some of our selenium is missing, New Scientist, 1995, 18, 46-47,
42. J. H. Ansede, P. J. Pellechia, and D. C. Yoch, Selenium Biotransformation by the Salt Marsh Cordgrass Spartina alterniflora: Evidence for Dimethylselenoniopropionate Formation, Environ. Sci. Technol., 1999, 33, 2064-2069.
43. Zayed A, Lytle C M, Terry N. Accumulation and volatilization of different chemical species of selenium by plants. Planta 1998, 206, 284-92
44. Zieve, R. and P. J. Peterson, Volatilization of Selenium from Plants and Soils, Sci. Total Environ., 32:197-202, 1984
45. Fan T. W-M, Lane A N, Higashi R M. Selenium biotransformations by a euryhaline microalga isolated from a saline evaporation pond. Environ. Sci. Technol. 1997, 31, 569-576
46. D. Amouroux, O. F. X. Donard, Evasion of selenium to the atmosphere via biomethylation processes in the Gironde estuary, France. Marine Chem., 1997, 58, 173-188.
47. B. Carroll, Microbial and Geochemical Aspects of selenium Cycling in an Estuarine System-Lake Macquarie, NSW. Ph. D. Thesis, University of Sydney, 1999
48. McConnell K. P., and Portman O. W., Excretion of dimethyl selenide by the rat, J. Biol. Chem. 1952, 195, 277-282,
49. Dudley H. C., Toxicology of selenium. II. The urinary excretion of selenium., Am. J. Hyg. 1936, 23, 181-186:
50. Radzuik, B,; Loon, J. V., Atomic Absorption Spectroscopy as a Detector for the Gas Chromatographic Study of Volatile Selenium Alkanes From *Astragalus* racemosus, Sci. Total Environ., 1976, 6, 251-257.
51. Atkinson R, Aschmann S M, Hasegawa D, Thompson-Eagle E T, Frankenberger W T Jr. Kinetics of the atmospherically important reactions of dimethylselenide. Environ. Sci. Technol. 1990, 24:1326-1332.
52. Lewis, B. G., Johnson, C. M., and Delwiche, C. C., Release of volatile selenium compounds by plants. Collection procedures and preliminary observations, J. Agr. Food Chem., 1966, 14, 638-640.
53. D. Hansen, P. J. Duda, A. Zayed, and N. Terry. Selenium removal by constructed wetlands: role of biological volatilization. Environ. Sci. Technol. 1998, 32, 591-597.

54. Losi, M. E.; Frankenberger, W. T., Jr., Bioremediation of selenium in soil and water. Soil Sci 1997, 162, 692-702.
55. Losi, M. E.; Frankenberger, W. T., Jr., In: W. T. Frankenberger and R. A. Engberg, Editors, Environmental chemistry of selenium, Marcel Dekker, New York 1998, pp. 515-544.
56. White, C., Wilkinson, S. C., Gadd, G. M., The Role of Microorganisms in Biosorption of Toxic Metals and Radionuclides, International Biodeterioration & Biodegradation 1995, 35, 17-40.
57. F. S. Lucas, and J. T. Hollibaugh, Response of Sediment Bacterial Assemblages To Selenate and Acetate Amendments, Environ. Sci. Technol., 2001, 35, 528-534.
58. Ardon, M., Woolmingtoh, K. and Pernick, A., Methylpentaaquochromium(III) ion, Inorg. Chem. 1971, 10, 2812.
59. H. Akagi, Y. Fujita, and E. Takabatake, Photochemical transformation of mercuric sulfide into methylmercury in aqueous solutions, Chem. Lett., 1976, 1-4.
60. L. Landner, Biochemical model for the biological methylation of mercury suggested from methylation studies in vivo with *Neurospora crassa*, Nature, 1971, 230, 452-454.
61. Van Fleet-Stalder and Chasteen, Using fluorine-induced chemiluminescence to detect organo-metalloids in the headspace of phototrophic bacterial cultures amended with selenium and tellurium, J. Photochem. Photobiol. B, 1998, 43, 193-203.
62. E. Kikuchi and H. Sakamoto, Kinetics of the reduction reaction of selenate ions by $TiO_2$ photocatalsst, J. Electrochem. Soc. 2000, 147, 4589-4593.
63. D. Amouroux, C. Pécheyran and O. F. X. Donard, Formation of volatile selenium species in synthetic seawater under light and dark experimental conditions, Appl. Organometal. Chem., 2000, 14, 236-244.
64. L. Yang, Z. Mester and R. E. Sturgeon, Improvement in measurement precision with SPME by use of isotope dilution mass spectrometry and its application to the determination of tributyltin in sediment using SPME GC-ICP-MS, J. Anal. At. Spectrom., 2002, 17, in print.
65. Z. Mester, R. E. Sturgeon, J. W. Lam, P. S. Maxwell and L. Peter, Speciation without chromatography. Part I. Determination of tributyltin in aqueous samples by chloride generation, headspace solid-phase microextraction and inductively coupled plasma time of flight mass spectrometry, J. Anal. At. Spectrom., 2001, 16, 1313-1316
66. Allmand and Reeve, The Photochemical Decomposition of Aqueous Formic Acid Solutions, J. Chem. Soc. 129: 2852-2863, 1926.
67. N. R. Dhar, The Chemical Action of Light, Blackie and Son Limited, London and Glasgow, 1931.
68. X. Guo, Gas Phase Enrichment Techniques In Hydride Generation Atomic Spectrometry, Ph.D. Thesis, Department of Chemistry, Northwest University, China, 1998.
69. T. D. Cooke and K. W. Bruland, Aquatic chemistry of selenium: evidence of biomethylation. Environ Sci Technol 1987, 12, 1214-1219.
70. J. R. Marquart, R. L. Belford and H. A. Fraenkel, Pyrolytic production of Se (3P) from carbon diselenide. I. Equilibrium, Int. J. Chem. Kinet., 1977, 9, :671-687.
71. T. G. Pearson and P. L. Robinson, Carbonyl Selenide. Part I. Preparation and Physical Properties., J. Chem. Soc., (1932) 652-660.
72. O. Glemser and T. Risler, Kohlenoxydverbindungen der Nichtmetalle I darstellung und Eigenschaften von Carbonylselenid, Z. Naturforsch. 3b:1-6, 1948.
73. Martin, J. L., Selenium assimilation in animals, in: Organic Selenium Compounds: Their Chemistry and Biology (D. L. Klayman and W. H. H. Gunther, eds.), John Wiley & Sons, New York, 1973; pp. 663-691.
74. Painter, E. P., The Chemistry and Toxicity of Selenium Compounds, with Special Reference to the Selenium Problem, Chem. Rev., 1941, 28, 179-213.
75. Dudley, H. C., and Miller, J. W., Toxicology of selenium. VI. Effect of subacute exposure to hydrogen selenide. J. Ind. Hyg. Toxicol., 1941, 23, 470-477.
76. Elaseer, A.; Nickless, G., Determination of selenium by gas chromatography-electron-capture detection using a rapid derivatization procedure, J. Chromatogr. A, 1994, 664, 77-87.
77. A. Chatterjee; Y. Dshibata, M. Yoneda; R. Banerjee; M. Uchida, H. Kon, and M. Morita, Identification of Volatile selenium Compounds Produced in the Hydride Generation System from Organoselenium Compounds. Anal. Chem., 2001, 73, 3181-3186.
78. T. W.-M. Fan, R. M. Higashi, A. N. Lane, Environ. Biotransformations of Selenium Oxyanion by Filamentous Cyanophyte-Dominated Mat Cultured from Agricultural Drainage Waters, Environ. Sci. Technol., 1998, 32, 3185-3193.
79. R. M. Rael, E. C. Tuazon and W. T. Frankenberger, Jr, Gas-phase reactions of dimethyl selenide with ozone and the hydroxyl and nitrate radicals. Atmos Environ 1996, 30, 1221-1232.
80. I. Szalai, H. D. Försterling, Z. Noszticzius, HPLC Studies on the Photochemical Formation of Free Radicals from Malonic Acid, J. Phys. Chem. A, 1998, 102, 3118-3120.
81. J. L. Gómez-Ariza, J. A. Pozas, I. Giráldez and E. Morales, Speciation of volatile forms of selenium and inorganic selenium in sediments by gas chromatography mass spectrometry, J. Chromatogr. A., 1998, 823, 259-277.
82. G. F. Combs, Jr., C. Garbisu, B. C. Yee, A. Yee, D. E. Carlson, N. R. Smith, A. C. Magyarosy, T. Leighton, and B. B. Buchanan, Bioavailability of selenium accumulated by selenite-reducing bacteria, Biol. Trace Elem. Res., 1996, 52, 209-225.
83. Francis, A. J., J. M. Duxbury, and M. Alexander. Evolution of dimethylselenide from soils. Appl. Microbiol. 1974, 28, 248-250.
84. Robert S. Dungan and William T. Frankenberger Jr., Factors affecting the volatilization of dimethylselenide by *Enterobacter cloacae* SLD1a-1, Soil Biology and Biochem., 2000, 32, 1353-1358.
85. C. R. Noller, Chemistry of Organic Compounds (3rd Edition), W.B. Saunders Company, Philadelphia and London, 1965, p993.
86. N. Terry, A. M. Zayed, M. P. de Souza, and A. S. Tarun, Selenium In Higher Plants, Annu. Rev. Plant Physiol. Plant Mol. Biol., 2000, 51, 401-432.
87. M. J. Barbosa, J. M. S. Rocha, J. Tramper and R. H. Wijffels, Acetate as a carbon source for hydrogen production by photosynthetic bacteria, J. Biotechnology, 2001, 85, 25-33.
88. Ohlendorf, H. M.; Hoffman, D. J.; Saiki, M. K.; Aldrich, T. W., Embryonic mortality and abnormalities of aquatic birds: apparent impacts of selenium from irrigation drain water, Sci. Total Environ. 1986, 52, 49-63.
89. Taylor, K.; Carlin, M.; Lacy, J.; Pease, W. Mass Emission Reduction Strategy for Selenium; Regional Water Quality Control Board Planning Division and Staff Report: Oakland, Calif., 1992

90. Terry N. 1998. Use of flow-through constructed wetlands for the remediation of selenium in agricultural tile drainage water. In 1997-1998 Tech. Progr. Rep., UC Salin./Drain. Res. Prog., Univ. Calif. Berkeley,
91. Kadlec, R. H.; Knight, R. L. Treatment Wetlands; CRC Press: New York, 1996.
92. Allen, K. N., Seasonal variation of selenium in outdoor experimental stream-wetland systems. J Environ Qual., 1991, 20, 865-868.
93. Duda, P. J. Chevron's Richmond Refinery Water Enhancement Wetland; Report to the Regional Water Quality Control Board; Oakland, Calif., 1992.
94. C. G. Wilber, Toxicology of selenium: a review. Clin. Toxicol. 1980, 17, 171-230.
95. Ganther, H. E.; Levander, O. A.; Bauman, C. A. Dietary control of Selnium volatilization in the rat, J. Nutr. 1966, 88, 55-60.
96. Haygarth P M, Harrison A F, Jones K C., Plant selenium from soil and the atmosphere. J. Environ. Qual. 1995, 24, 768-771.
97. Rotruck, J. T., A. L. Pope, H. E. Ganther, A. B. Swanson, D. G. Hafeman and W. G. Hoekstra. Selenium: Biochemical role as a component of glutathione peroxidase. Science. 1973, 179, 588-590.
98. Mayland, H. F. In Selenium in the Environment; Frankenburger, W. T., Jr., Benson S., Eds.; Marcel Dekker Inc.: New York, 1995; pp 29-45.
99. Obermeyer B. D., Palmer I. S., Olson O. E., et al., Toxicity of trimethylselenonium chloride in the rat with and without arsenite. Toxicol Appl Pharmacol, 1971, 20, 135-146.
100. Parizek J., Ostadalova I, Kalouskova J., et al, Effect of mercuric compounds on the maternal transmission of selenium in the pregnant and lactating rat. J. Reprod Fertil, 1971, 25, 157-170.
101. G. Mugesh, W. W. du Mont, and H. Sies, Chemistry of Biologically Important Synthetic Organoselenium Compounds, Chem. Rev., 2001, 101, 2125-2179.
102. Mond, L.; Langer, C.; Quincke, F. J. Chem. Soc. 1890, 57, 749.
103. Ermler, U.; Grabarse, W.; Shima, S.; Goubeaud, M.; Thauer, R. K. Science 1997, 278, 1457.
104. Zerner, B. Bioorg. Chem. 1991, 19, 116.
105. Volbeda, A.; Caron, M.-H.; Piras, C.; Hatchikian, E. C.; Frey, M.; Fontecilla C. J. C. Nature 1995, 373, 580.
106. Youn, H.-D.; Kim, E.-J., Hah, Y. C.; Kang, S.-O. Biochem. J. 1996, 318, 889.
107. Dobbek, H.; Svetlitchnyi, V.; Gremer, L.; Huber, R.; Meyer, O. Science 2001, 293, 1281.
108. Menon, S.; Ragsdale, S. W. Biochemistry 1996, 35, 12119.
109. Ea, A. E., Nickel Carbonyl, the international Nickel Co., 67 all St., New York, N.Y., 1955.
110. Rochow, E. G., Organometallic Chemistry, Reinhold Publishing Corporation, USA, 1964.
111. Guo, X.; Sturgeon, R. E.; Mester, Z.; Gardner; J. G. Anal. Chem. 2003, in press.
112. Guo, X.; Sturgeon, R. E.; Mester, Z.; Gardner; J. G. Appl. Orgnometal. Chem. 2003, in press.
113. Sunderman, F. W. Jr.; Roszel, N. O.; Clark, R. J. Arch Environ Health 1968, 16, 836.
114. Bidinosti, D. R.; McIntyre, N. S. Can. J. Chem. 1967, 45, 641.
115. Schildcrout, S. M.; Pressley, G. A., Jr; Stafford, F. E. J. Am. Chem. Soc. 1967, 89, 1617.
116. Khriachtchev, L.; Macôas, E.; Petterson, M.; Rääianen, M. J. Am. Chem. Soc. 2002, 124:10994.
117. Langford, S. R.; Batten, A. D.; Kono, M.; Shfold, M. N. R. J. Chem. Soc. 1997, 93, 3757.
118. Nieboer, E.; Nriagu, J. O., Eds.; Nickel and Human Health: Current Perspectives, John Willey & Sons, Inc., USA, 1992.
119. Tritsch, G. L. Nutrition 2000, 16, 698.
120. Feldmann, J.; Cullen, R. Environ. Sci. Technol. 1997, 31, 2125.
121. Feldmann, J. J. Environ. Monit. 1999, 1, 33.
122. Hetland, S.; Martinsen, I.; Radziuk, B.; Thomassen, Y. Anal. Sci., 1991, 7, 1029.
123. Sunderman, F. W. Am. J. Clin. Pathol. 1961, 35, 203.

We claim:

1. A method of synthesizing an element carbonyl compound from an ion of the element in an aqueous environment comprising the steps of:
   (i) adding a carboxylic acid to the aqueous environment; and,
   (ii) exposing the ion of the element and the carboxylic acid in the aqueous environment to a source of UV light, to reduce the ion and to form the element carbonyl compound having a carbon-element bond, wherein the element is selected from the group consisting of Se, Te, S, Ni, Co, Fe and Rh.

2. The method of claim 1, wherein the element is Ni.

3. The method of claim 1, wherein the element is Se.

4. The method of claim 1, wherein the carboxylic acid is selected from the group consisting of formic acid, acetic acid, propionic acid and malonic acid.

5. The method of claim 1 further comprising adding a photocatalyst to the aqueous environment.

6. The method of claim 5, wherein the photocatalyst is $TiO_2$ or $NO_3^-$.

7. The method of claim 1, wherein the element is Ni and the carboxylic acid is formic acid, acetic acid, propionic acid or malonic acid.

8. The method of claim 1, wherein the element carbonyl compound is volatile.

9. The method of claim 1, wherein the element carbonyl compound is $Ni(CO)_4$.

10. The method of claim 7, wherein the element carbonyl compound is $Ni(CO)_4$.

11. The method of claim 1, further comprising the step of collecting the element carbonyl compound from the aqueous environment.

12. The method of claim 10, further comprising the step of collecting the $Ni(CO)_4$ from the aqueous environment.

* * * * *